United States Patent
Chande et al.

(10) Patent No.: US 12,082,021 B2
(45) Date of Patent: Sep. 3, 2024

(54) CHANNEL STATE INFORMATION SCHEDULING REQUEST

(71) Applicant: QUALCOMM Incorporated, San Diego, CA (US)

(72) Inventors: Vinay Chande, San Diego, CA (US); Arumugam Chendamarai Kannan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/154,397

(22) Filed: Jan. 21, 2021

(65) Prior Publication Data

US 2021/0235302 A1   Jul. 29, 2021

Related U.S. Application Data

(60) Provisional application No. 62/965,114, filed on Jan. 23, 2020.

(51) Int. Cl.
   *H04W 24/10* (2009.01)
(52) U.S. Cl.
   CPC .................. *H04W 24/10* (2013.01)
(58) Field of Classification Search
   None
   See application file for complete search history.

(56) References Cited

U.S. PATENT DOCUMENTS

| | | | |
|---|---|---|---|
| 10,244,490 B2 | 3/2019 | Islam et al. | |
| 2013/0148611 A1 | 6/2013 | Moulsley et al. | |
| 2014/0105056 A1* | 4/2014 | Li | H04W 52/0203 370/252 |
| 2015/0078231 A1* | 3/2015 | Bergstrom | H04W 72/1268 370/311 |
| 2017/0013641 A1 | 1/2017 | Patel et al. | |

(Continued)

FOREIGN PATENT DOCUMENTS

WO   WO-2017176805   10/2017

OTHER PUBLICATIONS

International Search Report and Written Opinion—PCT/US2021/014623—ISA/EPO—dated May 7, 2021 (201652WO).

*Primary Examiner* — Liem H. Nguyen
(74) *Attorney, Agent, or Firm* — Holland & Hart LLP

(57) ABSTRACT

Methods, systems, and devices for wireless communications are described. A user equipment (UE) may support channel state information (CSI) operations, such as CSI reporting. A UE may identify a change in CSI pertaining to communications with a base station or any other change in communications with a base station. The UE may transmit, to the base station and based on the change in CSI, a CSI scheduling request, which may include an indication to activate or grant resources for a CSI report transmission from the UE to the base station. The UE may receive, from the base station, a CSI report trigger based on the CSI scheduling request, and transmit, in response to receipt of the CSI report trigger, a CSI report over a physical layer uplink channel (e.g., a physical uplink shared channel (PUSCH)).

28 Claims, 16 Drawing Sheets

(56) References Cited

U.S. PATENT DOCUMENTS

| | | | |
|---|---|---|---|
| 2017/0238289 A1* | 8/2017 | Zhang | H04L 1/0026 |
| | | | 370/329 |
| 2019/0098655 A1* | 3/2019 | Shih | H04B 7/0695 |
| 2019/0149379 A1* | 5/2019 | Xiong | H04L 5/0025 |
| | | | 370/329 |
| 2019/0150172 A1 | 5/2019 | Ang et al. | |
| 2019/0159255 A1* | 5/2019 | Zheng | H04W 48/16 |
| 2019/0281594 A1* | 9/2019 | Aiba | H04W 72/23 |
| 2019/0296854 A1* | 9/2019 | Kubo | H04B 17/327 |
| 2019/0313399 A1 | 10/2019 | Cheng et al. | |
| 2019/0327743 A1* | 10/2019 | Shi | H04L 1/1854 |
| 2019/0364591 A1* | 11/2019 | Berglund | H04W 72/14 |
| 2020/0021422 A1* | 1/2020 | Chen | H04W 72/0446 |
| 2020/0022010 A1* | 1/2020 | Kim | H04W 16/14 |
| 2020/0092685 A1* | 3/2020 | Fehrenbach | H04W 4/46 |
| 2020/0178240 A1* | 6/2020 | Zhang | H04L 1/0026 |
| 2020/0322113 A1* | 10/2020 | Gao | H04W 24/10 |
| 2020/0383119 A1* | 12/2020 | Sun | H04L 5/0053 |
| 2021/0058961 A1* | 2/2021 | Patel | H04L 1/1812 |
| 2021/0127387 A1* | 4/2021 | Huang | H04L 5/0087 |
| 2021/0288861 A1* | 9/2021 | Einhaus | H04L 1/0029 |
| 2022/0217743 A1* | 7/2022 | Zhou | H04W 72/1263 |
| 2022/0279538 A1* | 9/2022 | Jung | H04L 5/0044 |
| 2022/0369346 A1* | 11/2022 | Xu | H04W 72/23 |

* cited by examiner

CHANNEL STATE INFORMATION SCHEDULING REQUEST

CROSS REFERENCE

The present Application for Patent claims the benefit of U.S. Provisional Patent Application No. 62/965,114 by CHANDE et al., entitled "CHANNEL STATE INFORMATION SCHEDULING REQUEST," filed Jan. 23, 2020, assigned to the assignee hereof, and expressly incorporated by reference herein.

FIELD OF TECHNOLOGY

The following relates to wireless communications and more specifically to a channel state information (CSI) scheduling request.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support channel state information (CSI) operations. As demand for communication efficiency increases, some wireless communications systems, such as 4G and 5G systems, may fail to provide satisfactory CSI operations, and as a result, may be unable to support high reliability or low latency communications, among other examples.

SUMMARY

Various aspects of the described techniques relate to configuring a communication device, which may be a user equipment (UE), to support channel state information (CSI) operations, such as CSI reporting in wireless communications systems. The described techniques may be used to configure the communication device with a CSI reporting configuration, to extend coverage for CSI reporting (e.g., aperiodic CSI reporting, semi-persistent CSI reporting). For example, the CSI reporting configuration may configure the communication device to transmit, to another communication device (e.g., a next-generation NodeBs or giga-NodeBs (either of which may be referred to as a gNB)), a CSI scheduling request (also referred to as CSI-SR), in response to a change in CSI pertaining to communications with the other communication device.

The CSI scheduling request may carry an indication, for the other communication device, to activate or grant resources for a CSI report. In some examples, the CSI reporting configuration may configure the communication device with various CSI scheduling triggers for the CSI scheduling request, as described herein. The communication device may transmit, in response to the CSI scheduling request, a CSI report to the other communication device. As such, the communication device may be configured to support CSI operations, for example, in 5G systems, which may be referred to as New Radio (NR) systems. The described techniques may include features for improvements to power consumption and, in some examples, may promote enhanced efficiency for high reliability and low latency operations in 5G systems, among other benefits.

A method of wireless communication at a UE is described. The method may include transmitting, to a base station, a CSI scheduling request, receiving, from the base station, a CSI report trigger based on the CSI scheduling request, and transmitting, in response to receipt of the CSI report trigger, a CSI report over a physical layer uplink channel.

An apparatus for wireless communication is described. The apparatus may include a processor, memory coupled with the processor, and instructions stored in the memory. The instructions may be executable by the processor to cause the apparatus to transmit, to a base station, a CSI scheduling request, receive, from the base station, a CSI report trigger based on the CSI scheduling request, and transmit, in response to receipt of the CSI report trigger, a CSI report over a physical layer uplink channel.

Another apparatus for wireless communication is described. The apparatus may include means for transmitting, to a base station, a CSI scheduling request, receiving, from the base station, a CSI report trigger based on the CSI scheduling request, and transmitting, in response to receipt of the CSI report trigger, a CSI report over a physical layer uplink channel.

A non-transitory computer-readable medium storing code for wireless communication at a UE is described. The code may include instructions executable by a processor to transmit, to a base station, a CSI scheduling request, receive, from the base station, a CSI report trigger based on the CSI scheduling request, and transmit, in response to receipt of the CSI report trigger, a CSI report over a physical layer uplink channel.

Some examples of the method, apparatuses, and non-transitory computer-readable medium described herein may further include operations, features, means, or instructions for identifying, at the UE, a change in CSI pertaining to communications with the base station, where the CSI scheduling request is transmitted based on the identifying.

Some examples of the method, apparatuses, and non-transitory computer-readable medium described herein may further include operations, features, means, or instructions for including, in the CSI scheduling request, a first indication that the base station may be to activate or grant resources for a CSI report transmission from the UE to the base station.

In some examples of the method, apparatuses, and non-transitory computer-readable medium described herein, receiving the CSI report trigger may include operations, features, means, or instructions for receiving a second indication that the resources for the CSI report transmission may have been activated or granted.

In some examples of the method, apparatuses, and non-transitory computer-readable medium described herein, transmitting the CSI scheduling request may include operations, features, means, or instructions for transmitting the CSI scheduling request on one or more dedicated resources, or over the physical layer uplink channel carrying hybrid automatic repeat request (HARQ) information, or a combination thereof.

In some examples of the method, apparatuses, and non-transitory computer-readable medium described herein, the one or more dedicated resources may be different from scheduling request resources associated with scheduling requests for uplink transmissions other than a CSI report transmission.

In some examples of the method, apparatuses, and non-transitory computer-readable medium described herein, the CSI scheduling request may be a bit indication.

In some examples of the method, apparatuses, and non-transitory computer-readable medium described herein, the CSI report trigger includes downlink control information (DCI) signaling or a medium access control control element (MAC-CE) signaling.

In some examples of the method, apparatuses, and non-transitory computer-readable medium described herein, transmitting the CSI scheduling request may include operations, features, means, or instructions for transmitting the CSI scheduling request via resources associated with one or more sounding reference signals (SRSs).

Some examples of the method, apparatuses, and non-transitory computer-readable medium described herein may further include operations, features, means, or instructions for partitioning the resources associated with the one or more SRSs, where the partitioning includes an indication of a presence of the CSI scheduling request.

Some examples of the method, apparatuses, and non-transitory computer-readable medium described herein may further include operations, features, means, or instructions for autonomously generating the CSI scheduling request.

Some examples of the method, apparatuses, and non-transitory computer-readable medium described herein may further include operations, features, means, or instructions for detecting a CSI scheduling request trigger, and generating the CSI scheduling request based on the CSI scheduling request trigger.

In some examples of the method, apparatuses, and non-transitory computer-readable medium described herein, detecting the CSI scheduling request trigger may include operations, features, means, or instructions for identifying a channel interference measurement associated with a preceding CSI report prior to the CSI report, and comparing the channel interference measurement associated with the preceding CSI report to one or more channel interference measurements associated with other previous CSI reports.

In some examples of the method, apparatuses, and non-transitory computer-readable medium described herein, detecting the CSI scheduling request trigger may include operations, features, means, or instructions for receiving one or more packets in accordance with a modulation and coding scheme (MCS), and determining that the MCS satisfies a threshold based on a log-likelihood ratio associated with decoding the one or more packets, where generating the CSI scheduling request may be based on determining that the MCS satisfies the threshold.

In some examples of the method, apparatuses, and non-transitory computer-readable medium described herein, detecting the CSI scheduling request trigger may include operations, features, means, or instructions for determining an uplink power level based on a maximum permissible exposure limit, where generating the CSI scheduling request may be based on determining the uplink power level.

In some examples of the method, apparatuses, and non-transitory computer-readable medium described herein, detecting the CSI scheduling request trigger may include operations, features, means, or instructions for receiving one or more reservation signals in an unlicensed radio frequency spectrum band, the one or more reservation signals including channel interference information, where generating the CSI scheduling request may be based on receiving the one or more reservation signals.

In some examples of the method, apparatuses, and non-transitory computer-readable medium described herein, detecting the CSI scheduling request trigger may include operations, features, means, or instructions for determining power headroom information, and determining that a power headroom associated with uplink communications satisfies a threshold based on the power headroom information, where generating the CSI scheduling request may be based on the power headroom associated with the uplink communications satisfying the threshold.

In some examples of the method, apparatuses, and non-transitory computer-readable medium described herein, the CSI report includes an aperiodic CSI report.

In some examples of the method, apparatuses, and non-transitory computer-readable medium described herein, the CSI report includes a semi-persistent CSI report.

Some examples of the method, apparatuses, and non-transitory computer-readable medium described herein may further include operations, features, means, or instructions for receiving signaling including a CSI scheduling request configuration from the base station, where transmitting the CSI scheduling request is based at least in part on the CSI scheduling request configuration.

Some examples of the method, apparatuses, and non-transitory computer-readable medium described herein may further include operations, features, means, or instructions for identifying one or more resources for the CSI scheduling request based at least in part on the CSI scheduling request configuration, the one or more resources are preconfigured, where transmitting the CSI scheduling request includes transmitting the CSI scheduling request on the one or more preconfigured resources.

Some examples of the method, apparatuses, and non-transitory computer-readable medium described herein may further include operations, features, means, or instructions for determining, based at least in part on the CSI scheduling request configuration, a CSI scheduling request trigger, the CSI scheduling request configuration including a threshold value for the CSI or a parameter related to the CSI, or both; and generating the CSI scheduling request based at least in part on the CSI scheduling request trigger, where transmitting the CSI scheduling request is based at least in part on the generating.

In some examples of the method, apparatuses, and non-transitory computer-readable medium described herein, the CSI scheduling request configuration corresponds to one or more directional beams transmitted by the base station.

A method of wireless communication at a base station is described. The method may include receiving a CSI scheduling request from a UE, transmitting a CSI report trigger based on the CSI scheduling request, and receiving, in response to the CSI report trigger, a CSI report over a physical layer uplink channel.

An apparatus for wireless communication is described. The apparatus may include a processor, memory coupled with the processor, and instructions stored in the memory.

The instructions may be executable by the processor to cause the apparatus to receive a CSI scheduling request from a UE, transmit a CSI report trigger based on the CSI scheduling request, and receive, in response to the CSI report trigger, a CSI report over a physical layer uplink channel.

Another apparatus for wireless communication is described. The apparatus may include means for receiving a CSI scheduling request from a UE, transmitting a CSI report trigger based on the CSI scheduling request, and receiving, in response to the CSI report trigger, a CSI report over a physical layer uplink channel.

A non-transitory computer-readable medium storing code for wireless communication at a base station is described. The code may include instructions executable by a processor to receive a CSI scheduling request from a UE, transmit a CSI report trigger based on the CSI scheduling request, and receive, in response to the CSI report trigger, a CSI report over a physical layer uplink channel.

Some examples of the method, apparatuses, and non-transitory computer-readable medium described herein may further include operations, features, means, or instructions for identifying, in the CSI scheduling request, a first indication that the base station may be to activate or grant resources for a CSI report transmission from the UE to the base station, and activating or granting the resources for the CSI report transmission.

In some examples of the method, apparatuses, and non-transitory computer-readable medium described herein, transmitting the CSI report trigger may include operations, features, means, or instructions for transmitting a second indication that the resources for the CSI report transmission may have been activated or granted.

In some examples of the method, apparatuses, and non-transitory computer-readable medium described herein, receiving the CSI scheduling request may include operations, features, means, or instructions for receiving the CSI scheduling request on one or more dedicated resources or over the physical layer uplink channel carrying HARQ information, or a combination thereof.

In some examples of the method, apparatuses, and non-transitory computer-readable medium described herein, the CSI scheduling request may be transmitted in association with the one or more dedicated resources that may be different from scheduling request resources associated with scheduling requests for uplink transmissions other than a CSI report transmission.

In some examples of the method, apparatuses, and non-transitory computer-readable medium described herein, the CSI scheduling request may be a bit indication.

In some examples of the method, apparatuses, and non-transitory computer-readable medium described herein, the CSI report trigger includes DCI signaling.

In some examples of the method, apparatuses, and non-transitory computer-readable medium described herein, the CSI report trigger includes a MAC-CE signaling.

In some examples of the method, apparatuses, and non-transitory computer-readable medium described herein, receiving the CSI scheduling request may include operations, features, means, or instructions for receiving the CSI scheduling request via one or more SRS.

In some examples of the method, apparatuses, and non-transitory computer-readable medium described herein, a partition of the one or more SRS may be an indication of a presence of the CSI scheduling request.

In some examples of the method, apparatuses, and non-transitory computer-readable medium described herein, a partition of the one or more SRS may be an indication of an absence of the CSI scheduling request.

In some examples of the method, apparatuses, and non-transitory computer-readable medium described herein, the CSI report includes an aperiodic CSI report.

In some examples of the method, apparatuses, and non-transitory computer-readable medium described herein, the CSI report includes a semi-persistent CSI report.

Some examples of the method, apparatuses, and non-transitory computer-readable medium described herein may further include operations, features, means, or instructions for determining, based at least in part on the CSI scheduling request configuration, a CSI scheduling request trigger, the CSI scheduling request configuration including a threshold value for the CSI or a parameter related to the CSI, or both; and generating the CSI scheduling request based at least in part on the CSI scheduling request trigger, where transmitting the CSI scheduling request is based at least in part on the generating.

In some examples of the method, apparatuses, and non-transitory computer-readable medium described herein, the CSI scheduling request configuration corresponds to one or more directional beams associated with the UE.

DETAILED DESCRIPTION

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including 4G systems, such as Long Term Evolution (LTE) systems, as well as 5G systems, which may be referred to as New Radio (NR) systems. Some UEs may support channel state information (CSI) operations, such as CSI reporting. These systems, however, rely on the base station to schedule or activate CSI reporting for the UEs. In some cases, if the UEs determine a change in CSI and determines that it may be beneficial to provide a CSI report update based on the change, the UEs may wait until either a next periodic CSI reporting opportunity or receipt of a CSI reporting request from the base station (for aperiodic reporting) to provide the new CSI report.

The described techniques may be used to configure the UEs with a CSI reporting configuration, to extend coverage for CSI reporting (e.g., aperiodic CSI reporting, semi-persistent CSI reporting). For example, the CSI reporting configuration may configure the UEs to transmit, to the base station, a CSI scheduling request (also referred to as CSI-SR), in response to a change in CSI pertaining to communications with the base station. The CSI scheduling request may carry an indication, for the base station, to activate or grant resources for a CSI report. In some examples, the CSI reporting configuration may configure the UEs with various CSI report triggers for the CSI scheduling request, as described herein. The UEs may transmit, in response to the CSI scheduling request, a CSI report to the base station.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to directional communications when operating in 5G systems. In some examples, configuring the UE to provide a CSI scheduling request for CSI reporting, among other examples in 5G systems, may support improvements to power consumption, spectral efficiency, higher data rates and, in some examples, may promote enhanced efficiency for beam operations, among other benefits.

Aspects of the disclosure are initially described in the context of wireless communications systems. Aspects of the disclosure are then illustrated by and described with references to process flows that relate to CSI scheduling. Aspects of the disclosure are further illustrated by and described with reference to apparatus diagrams, system diagrams, and flowcharts that relate to CSI scheduling.

Figure 1:
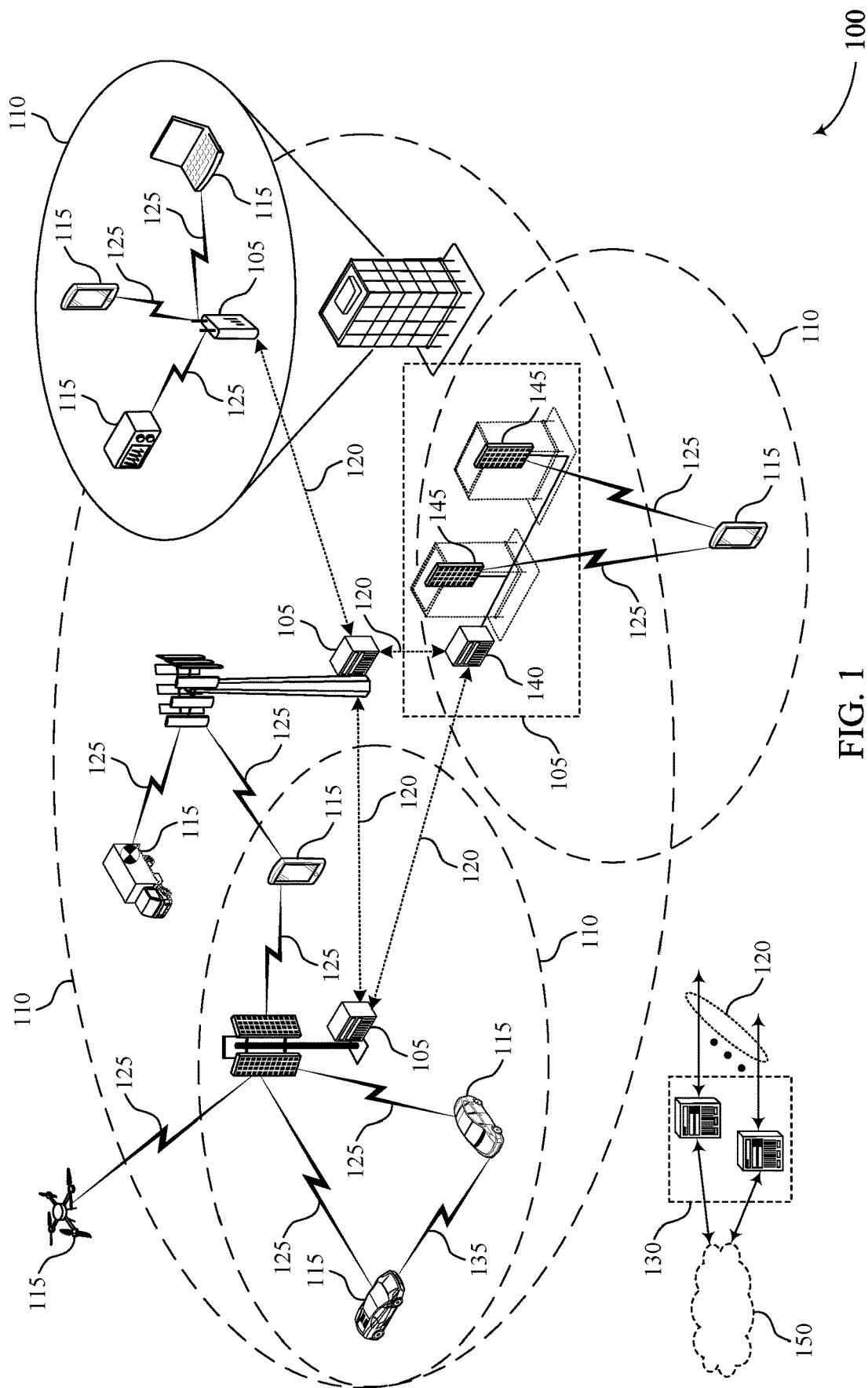
FIGS. 1 and 2 illustrate examples of wireless communications systems that support a channel state information (CSI) scheduling request in accordance with aspects of the present disclosure.

FIG. 1 illustrates an example of a wireless communications system 100 that supports a CSI scheduling request in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The base stations 105 may configure the UEs 115 with a CSI reporting configuration, to extend coverage for CSI reporting (e.g., aperiodic CSI reporting, semi-persistent CSI reporting) and to manage or improve directional communications between the base stations 105 and the UEs 115. For example, the CSI reporting configuration may configure the UEs 115 to transmit, to the base stations 105, a CSI scheduling request (also referred to as CSI-SR), in response to a change in CSI pertaining to communications with the base stations 105. The CSI scheduling request may carry an indication, for the base stations 105, to activate or grant resources for a CSI report. In some examples, the CSI reporting configuration may configure the UEs 115 with various CSI scheduling triggers for the CSI scheduling request, as described herein. The UEs 115 may transmit, in response to the CSI scheduling request, a CSI report to the base station 105. As such, the UEs 115 may be configured to support CSI operations, for example, in 5G systems, which may be referred to as NR systems.

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
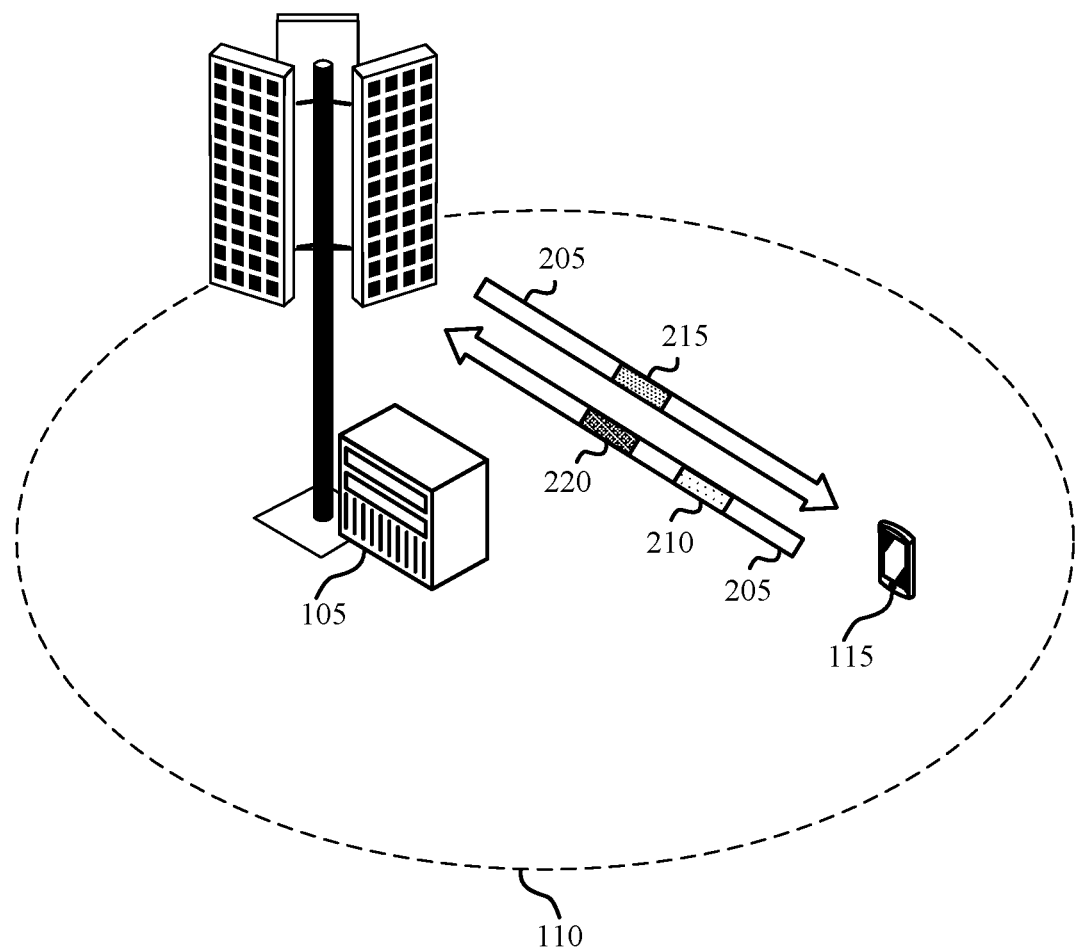

FIG. 2 illustrates an example of a wireless communications system 200 that supports a CSI scheduling request in accordance with aspects of the present disclosure. In some examples, the wireless communications system 200 may implement aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency CSI operations, among other benefits.

The base station 105 and the UE 115 may be configured with multiple antennas, which may be used to employ techniques such as transmit diversity, receive diversity, MIMO communications, or beamforming, or any combination thereof. The antennas of the base station 105 and the UE 115 may be located within one or more antenna arrays or antenna panels, which may support MIMO operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various MIMO or beamforming operations. Additionally or alternatively, an antenna panel may support radio frequency beamforming for a signal transmitted via one or more antenna ports. The base station 105 and the UE 115 may thus be configured to support directional communications 205 using the multiple antennas.

The UE 115, in the wireless communications system 200, may support CSI operations to preserve resources (for example, time and frequency resources of the wireless communications system 200), a battery life of the UE 115, among other examples. In some examples, the UE 115 may be configured to support CSI operations to manage or improve the directional communications 205 between the base station 105 and the UE 115. For example, the base station 105 may transmit, and the UE 115 may receive, a CSI reporting configuration that may be used to configure the UE 115 with CSI operations. As demand for communication efficiency increases, some wireless communications systems, such as 4G and 5G systems, may fail to provide satisfactory CSI operations (e.g., CSI reporting), and as a result, may be unable to support high reliability or low latency communications, among other examples.

In 5G systems, for example, such as in mmW operations in frequency range 2 (FR2), as well as in high-band deployments (>52 GHz), interference conditions experienced by the UE 115 may change in a short period due to use of the directional communications 205 and beamforming gains. Thus, reported CSI information may be stale because it no longer may reflect accurate channel and interference conditions, which can be costly for downlink performance from the base station 105 to the UE 115, as well as uplink performance from the UE 115 to the base station 105. Additionally, overhead related to CSI reporting, for example, larger bandwidths and smaller slot durations may lead to greater number of slots between two CSI reports (e.g., two periodic CSI reports) from the UE 115. This may create higher relative penalty of stale CSI information. For example, at periodic CSI reporting periodicity of 1 ms per CSI report, a CSI report may have to be used for as many as 64 slots for operation with a subcarrier spacing (SCS) of 960 kHz.

To address the above demand for communication efficiency and avoid stale CSI information, the UE 115 may be configured to support CSI operations to manage or improve the directional communications 205 with the base station 105. In some examples, the base station 105 may transmit, and the UE 115 may receive, a CSI reporting configuration that may be used to configure the UE 115 with CSI operations. In some examples, the CSI operations may include providing a CSI scheduling request 210 to the base station 105 via the directional communications 205. For example, the UE 115 may identify a change in CSI pertaining to the directional communications 205 or any other change associated with directional communication 205 such as a bandwidth part (BWP) change. As a result, the UE 115 may transmit the CSI scheduling request 210 to the base station 105 via the directional communications 205 (e.g., a physical uplink control channel (PUCCH), a physical uplink shared channel (PUSCH)).

The UE 115 may include, in the CSI scheduling request 210, an indication that the base station 105 is to activate or grant resources for a CSI report 220. In other words, the CSI scheduling request 210 may be a message from the UE 115 to the base station 105 to activate or grant, or both, resources to the UE 115 for the CSI report 220, which may carry new CSI information based on the change in the CSI pertaining to the directional communications 205. The resources may include time and frequency resources, for example, such as symbols, minislots, or slots, subcarriers, carriers, or any combination thereof. Upon receiving the CSI scheduling request 210, the base station 105 may activate or grant, or both, the resources for the CSI report 220.

In some examples, the base station 105 may transmit a CSI report trigger 215, which may carry an indication that the resources for the CSI report transmission have been activated or granted. For example, the base station 105 may transmit the CSI report trigger 215 via DCI signaling, MAC-CE signaling, or a combination thereof. In response to the reception of the CSI report trigger 215, the UE 115 may generate and transmit the CSI report 220 to the base station 105 via the directional communications 205. The CSI report 220 may include one or more CSI parameters. In some examples, the UE 115 may generate the CSI report 220 including the one more CSI parameters based on measuring one or more reference signals, such as a synchronization signal physical broadcast channel (SS/PBCH) block (SSB) or a CSI-RS from the base station 105. For example, the base station 105 may transmit, and the UE 115 may receive, one or more SSBs or CSI-RS via the directional communications 205 between the base station 105 and the UE 115.

The one or more CSI parameters may include one or more of a channel quality indicator (CQI), a PMI, or a CSI reference signal (CSI-RS) indicator (CRI). In some other examples, the one or more CSI parameters may additionally or alternatively include one or more of a synchronization signal physical broadcast channel (SS/PBCH) block resource indicator (SSBRI), a layer indicator (LI), a rank indicator (RI), or a layer one reference signal received power (L1-RSRP). In some examples, the UE 115 may determine the LI based in part on the CQI, the PMI, the RI, or the CRI, or any combination thereof. The UE 115 may, in some examples, determine the CQI based in part on the PMI, the RI, or the CRI, or any combination thereof. In some examples, the UE 115 may determine the PMI based in part on the RI or the CRI, or both. The UE 115 may determine the RI based in part on the CRI.

The UE 115 may transmit the CSI report 220 via the directional communications 205. The directional communications 205 may include providing the CSI report 220 on one or more physical channels, such as a PUSCH, a PUCCH, or the like. In some examples, the CSI report 220 may be an aperiodic CSI report, and the UE 115 may transmit the aperiodic CSI report on a PUSCH according to the CSI reporting configuration. In some examples, the CSI report 220 may be a periodic CSI report, and the UE 115 may transmit the periodic CSI report using a PUCCH according to the CSI reporting configuration. Alternatively, the CSI report 220 may be a semi-persistent CSI report, and the UE 115 may transmit the semi-persistent CSI report using PUCCH or a DCI activated PUSCH, according to the CSI reporting configuration.

The operations performed by the base station 105 and the UE 115, for example, may thus provide improvements to directional operations in the wireless communications system 200, as well as extend CSI reporting coverage. Further, the operations performed by the base station 105 and the UE 115 may provide benefits and enhancements to the operation of the UE 115. For example, by supporting CSI reporting dependent on CSI scheduling requests in the wireless communications system 200, various operational characteristics, such as power consumption, may be reduced. The operations performed by the base station 105 and the UE 115 may also promote efficiency of the UE 115 by reducing latency associated with processes related to high reliability and low latency directional communications operations (such as, beam management operations).

Figure 3:
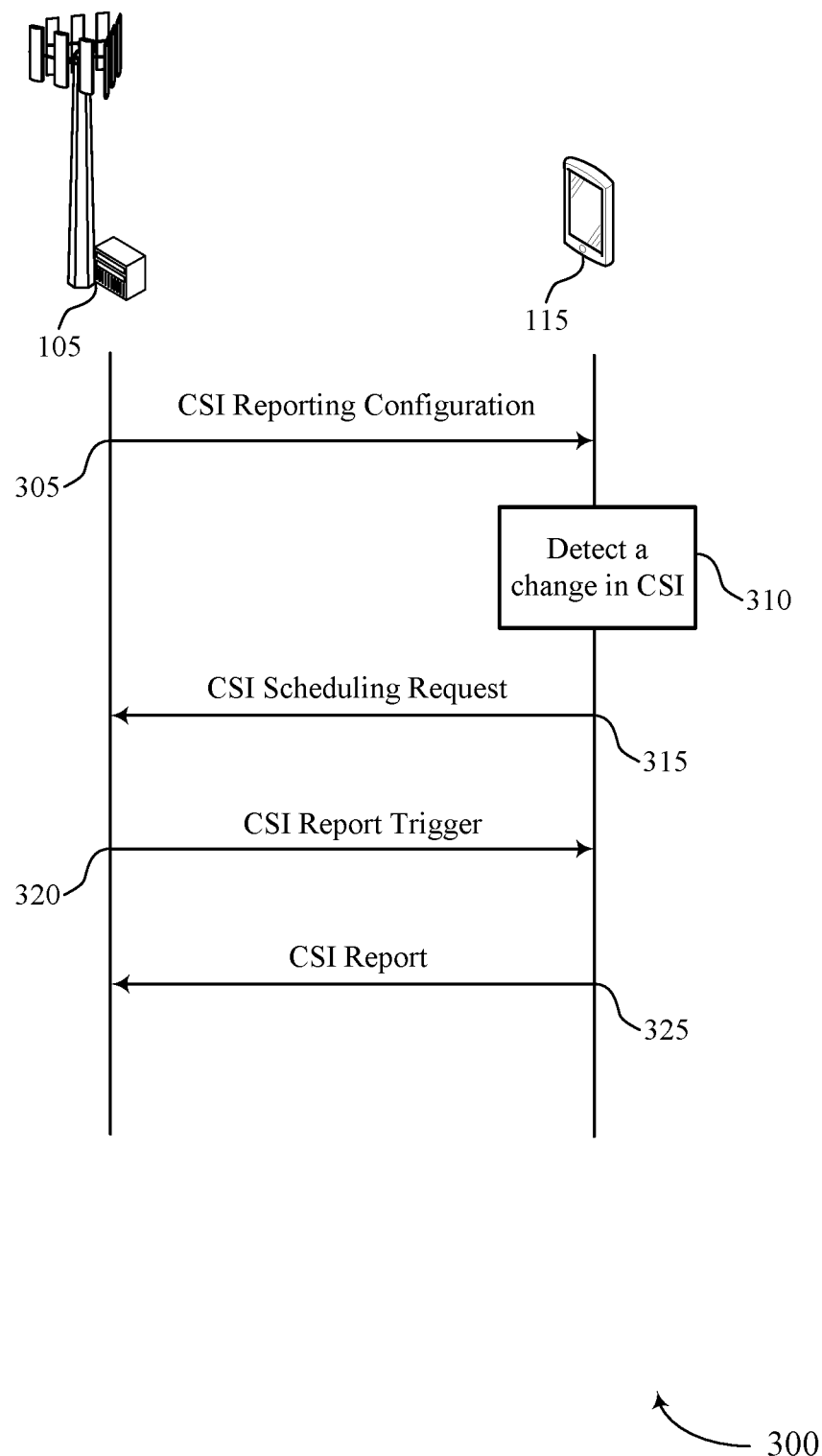
FIG. 3 illustrates an example of a process flow that supports a CSI scheduling request in accordance with aspects of the present disclosure.

FIG. 3 illustrates an example of a process flow 300 that supports a CSI scheduling request in accordance with aspects of the present disclosure. The process flow 300 may implement aspects of the wireless communications system 100 and 200 described with reference to FIGS. 1 and 2, respectively. For example, the process flow 300 may be based on a configuration by a base station 105 or a UE 115, and implemented by the UE 115. The base station 105 and the UE 115 may be examples of a base station and a UE, as described with reference to FIGS. 1 and 2. In the following description of the process flow 300, the operations between the base station 105 and the UE 115 may be transmitted in a different order than the example order shown, or the operations performed by the base station 105 and the UE 115 may be performed in different orders or at different times. Some operations may also be omitted from the process flow 300, and other operations may be added to the process flow 300.

At 305, the base station 105 may transmit a CSI reporting configuration, which may also include a CSI scheduling request configuration, to the UE 115. In some examples, the base station 105 may transmit the CSI reporting configuration via RRC signaling. The CSI reporting configuration may configure the UE 115 with CSI operations, for example, such as CSI reporting. Additionally, the CSI reporting configuration may configure the UE 115 with various CSI scheduling request triggers to extend CSI reporting according to a CSI scheduling request, as described herein. The UE 115 may manage or improve directional communications (e.g., one or more mmW directional beams) according to the CSI reporting configuration or the CSI scheduling request configuration, or both. For example, the UE 115 may switch one or more mmW directional beams or modify a parameter associated with the one or more mmW directional beams based on the CSI reporting configuration or the CSI scheduling request configuration, or both.

At 310, the UE 115 may detect a change in CSI or any other change in communication with the base station 105 (e.g., change in BWP). For example, the UE 115 may determine a change in one or more CSI values, which may include one or more of a CQI, a PMI, a CRI, or any other related measurements. In some other examples, the one or more CSI parameters may additionally or alternatively include one or more of a SSBRI, a LI, a RI, or a L1-RSRP. In some examples, the UE 115 may determine the LI based in part on the CQI, the PMI, the RI, or the CRI, or any combination thereof. The UE 115 may, in some examples, determine the CQI based in part on the PMI, the RI, or the CRI, or any combination thereof. In some examples, the UE 115 may determine the PMI based in part on the RI or the CRI, or both. The UE 115 may determine the RI based in part on the CRI.

At 315, the UE 115 may transmit a CSI scheduling request to the base station 105. The CSI scheduling request may carry an indication, for the base station 105, to activate or grant resources for a period, aperiodic, or semi-persistent CSI report. In some examples, the UE 115 may transmit the CSI scheduling request on one or more dedicated resources or over a physical layer uplink channel (e.g., a PUSCH, a PUCCH) carrying HARQ information, or a combination thereof. For example, the UE 115 may piggyback on the physical layer uplink channel (e.g., a PUSCH, a PUCCH) carrying the HARQ information. Thus, the CSI scheduling request may be transmitted in association with the one or more dedicated resources that are different from scheduling request resources associated with scheduling requests for uplink transmissions other than a CSI report transmission. In some examples, the CSI scheduling request may correspond to a separate request identifier, a separate resource identifier, a separate periodicity and offset.

In some other examples, the UE 115 may transmit the CSI scheduling request on one or more reference signals, or the CSI scheduling request may be conveyed using the one or more reference signals. For example, the CSI scheduling request may a single bit indication or a multi-bit indication, which may be by use of one or more sounding reference signals (SRS) transmitted by the UE 115. In some examples, a signature space (i.e., offset/cyclic shift) used for the one or more SRS may be partitioned to convey presence or absence of the CSI scheduling request. For example, the UE 115 may partition the one or more SRSs, where the partitioning of the one or more SRSs is an indication of a presence of the CSI scheduling request. Alternatively, the UE 115 may partition the one or more SRSs, where the partitioning of the one or more SRSs is an indication of an absence of the CSI scheduling request.

In some examples, the UE 115 may autonomously generate and transmit the CSI scheduling request. Alternatively, the UE 115 may transmit the CSI scheduling request based on a CSI scheduling request trigger, in response to the change in the CSI. For example, the UE 115 may identify a channel interference measurement associated with a preceding CSI report, and compare the channel interference measurement associated with the preceding CSI report to one or more channel interference measurements associated with other previous CSI reports. In other words, the UE 115 may store channel interference measurements used for previously-sent CSI reports and compare them with corresponding latest channel interference measurements. Thus, the CSI scheduling request trigger may be a determination of a change in the channel interference measurement based on the comparison. As such, the UE 115 may generate and transmit the CSI scheduling request to the base station 105 based on the comparison of the stored channel interference measurements used for previously-sent CSI reports and the corresponding latest channel interference measurements.

In some other examples, the UE 115 may receive one or more packets in accordance with an MCS, and determine that the MCS satisfies a threshold based part on a log-likelihood ratio associated with decoding the one or more packets. In other words, the UE 115 may determine, from the log-likelihood ratio, that scheduled MCS for control or data, or both satisfies a threshold (e.g., an MCS threshold). Thus, the CSI scheduling request trigger may be the determination that the scheduled MCS for control or data, or both satisfies the threshold. As such, the UE 115 may generate and transmit the CSI scheduling request to the base station 105 based on this determination. In other examples, the UE 115 may determine an uplink power level based on a maximum permissible exposure. In other words, the UE 115 may determine presence of blocking, between the UE 115 and the base station 105 by another device or object, for example by mechanisms used to determine triggering of throttling uplink power for maximum permissible exposure requirements. Thus, the CSI scheduling request trigger may be the determination of the uplink power level. As such, the UE 115 may generate and transmit the CSI scheduling request to the base station 105 based on this determination.

In some other examples, the UE 115 may receive and decode one or more reservation signals in an unlicensed radio frequency spectrum band. The one or more reservation signals may include channel interference information. In other words, in unlicensed operations, the UE 115 may decode one or more reservation signals from other devices (e.g., other UEs). The channel interference information may carry an indication of upcoming interference due to channel access by the other devices. The channel interference information may also carry a type of interference (e.g., a low level interference condition, a medium level interference condition, a high level interference condition). The low level interference condition may correspond to a first threshold (e.g., traffic threshold), the medium level interference condition may correspond to a second threshold (e.g., traffic threshold) different from the first threshold (e.g., the first threshold may be less than the second threshold), and the high level interference condition may correspond to a third threshold (e.g., traffic threshold) different from the first threshold and the second threshold (e.g., the first threshold may be less than the second threshold, which may be less than the third threshold). As such, the UE 115 may generate and transmit the CSI scheduling request to the base station 105 based on the one or more reservation signals received and decoded from the other devices (e.g., other UEs).

In some examples, the UE 115 may determine power headroom information, and determine that a power headroom associated with uplink communications satisfies a threshold based on the power headroom information. For example, meeting the threshold (e.g., a power headroom limitation) may indicate a new cell edge for the UE 115. Thus, the CSI scheduling request trigger may include this determination of the power headroom associated with the uplink communications satisfying the threshold (e.g., a power headroom limitation). As such, the UE 115 may generate and transmit the CSI scheduling request to the base station 105 to extend CSI and cover CSI information related to the new cell edge for the UE 115.

At 320, upon reception of the CSI scheduling request, the base station 105 may transmit a CSI report trigger. For example, the base station 105 may activate or grant, or both, the resources for the CSI report. Thus, the CSI report trigger may carry an indication that the resources for the CSI report have been activated or granted. In some examples, the CSI report trigger may be signaled via DCI signaling or MAC-CE signaling, which be used to trigger the CSI reporting and active the resources requested by the UE 115. At 325, the UE 115 may transmit a CSI report to the base station 105. For example, the UE 115 may prepare and transmit an aperiodic CSI report or a semi-persistence CSI report that is activated by the base station 105. Therefore, in 5G systems, CSI reporting may be configured by RRC, and in case of aperiodic and semi-persistent CSI reporting, the CSI reporting may be activated/triggered by DCI or by MAC-CE in response to the CSI scheduling request.

Alternatively, in some examples, the UE 115 may transmit a CSI report (e.g., a pre-agreed CSI report) on one or more preconfigured resources based on a preconfigured trigger (e.g., a power level, an MCS threshold, a reservation signal), as described above. In some examples, the UE 115 may transmit the CSI report (e.g., the pre-agreed CSI report) on the one or more preconfigured resources irrespective of a DCI or a MAC-CE activation from the base station 105. In other words, there may be no subsequent DCI or MAC-CE activation from the base station 105 for the CSI report, but the UE 115 may still transmit the pre-agreed CSI report on the one or more preconfigured resources.

The operations performed by the base station 105 and the UE 115, for example, may thus provide improvements to CSI operations. For example, the CSI operations performed in the process flow 300 may reduce CSI reporting overhead, as well as increase reliability of CSI reporting and decreasing resources for outer-loop algorithms to obtain accurate MCS estimates in rapidly varying channel conditions. Further, the operations performed by the base station 105 and the UE 115 may provide benefits and enhancements to the operation of the UE 115. For example, by supporting CSI reporting dependent on CSI scheduling requests, various operational characteristics, such as power consumption, may be reduced. The UE 115 may also experience improved directional communications based on the CSI operations performed in the process flow 300. For example, one or more of the above described triggers may relate to one or more mmW directional beams associated with the UE 115. To improve the directional communications, the UE 115 may switch one or more mmW directional beams or modify a parameter (e.g., a transmit power, a receive power, an orientation, a beam width) associated with the one or more mmW directional beams based on the one or more triggers.

Figure 4:
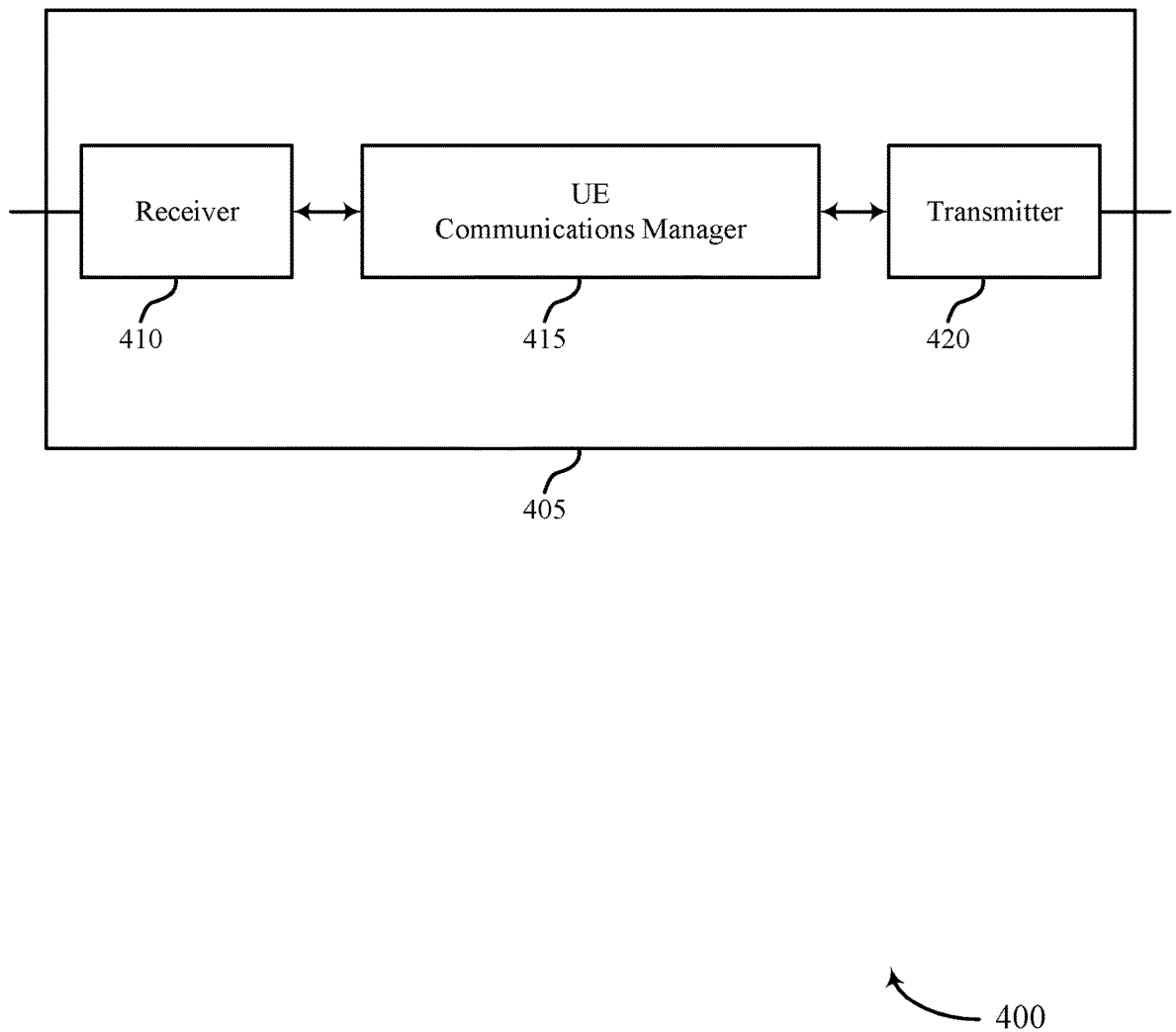
FIGS. 4 and 5 show block diagrams of devices that support a CSI scheduling request in accordance with aspects of the present disclosure.

FIG. 4 shows a block diagram 400 of a device 405 that supports a CSI scheduling request in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to CSI scheduling). Information may be passed on to other components of the device 405. The receiver 410 may be an example of aspects of the transceiver 720 described with reference to FIG. 7. The receiver 410 may utilize a single antenna or a set of antennas.

The UE communications manager 415 may transmit, to a base station, a CSI scheduling request, receive, from the base station, a CSI report trigger based on the CSI scheduling request, and transmit, in response to receipt of the CSI report trigger, a CSI report over a physical layer uplink channel. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an application-specific integrated circuit (ASIC), a field-programmable field array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
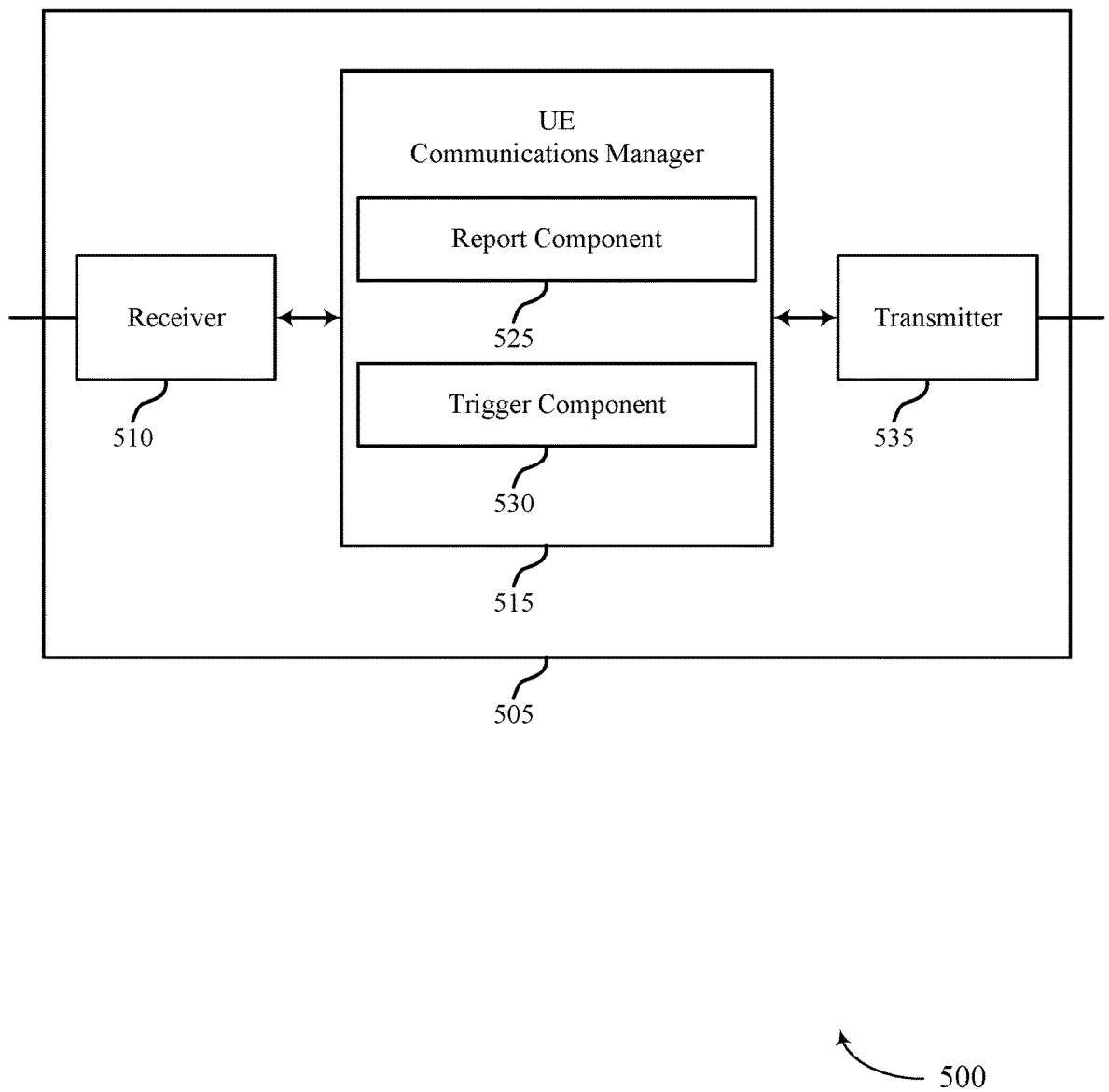

FIG. 5 shows a block diagram 500 of a device 505 that supports a CSI scheduling request in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to CSI scheduling). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a report component 525 and a trigger component 530. The UE communications manager 515 may be an example of aspects of the UE communications manager 710 described herein.

The report component 525 may transmit, to a base station, a CSI scheduling request and transmit, in response to receipt of the CSI report trigger, a CSI report over a physical layer uplink channel. The trigger component 530 may receive, from the base station, a CSI report trigger based on the CSI scheduling request.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
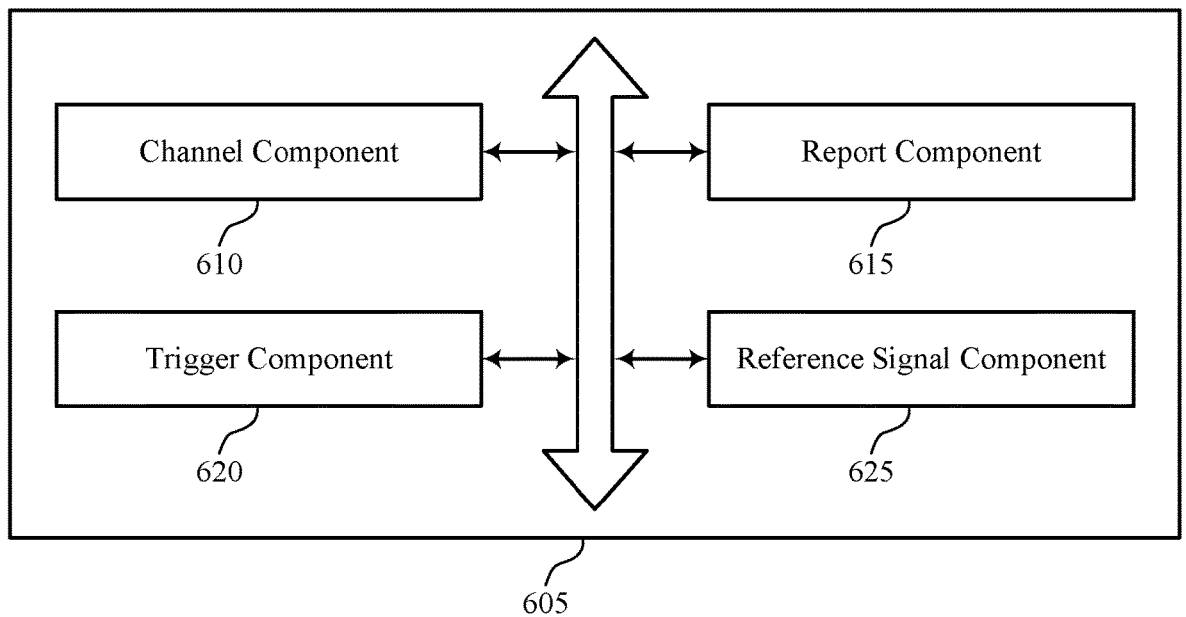
FIG. 6 shows a block diagram of a user equipment (UE) communications manager that supports a CSI scheduling request in accordance with aspects of the present disclosure.

FIG. 6 shows a block diagram 600 of a UE communications manager 605 that supports a CSI scheduling request in accordance with aspects of the present disclosure. The UE communications manager 605 may be an example of aspects of a UE communications manager 415, a UE communications manager 515, or a UE communications manager 710 described herein. The UE communications manager 605 may include a channel component 610, a report component 615, a trigger component 620, and a reference signal component 625. Each of these components may communicate, directly or indirectly, with one another (e.g., via one or more buses).

The report component 615 may transmit, to a base station, a CSI scheduling request. In some examples, the report component 615 may transmit, in response to receipt of a CSI report trigger, a CSI report over a physical layer uplink channel (e.g., a PUSCH). In some examples, the report component 615 may include, in the CSI scheduling request, a first indication that the base station is to activate or grant resources for a CSI report transmission from the UE to the base station. In some examples, the report component 615 may transmit the CSI scheduling request on one or more dedicated resources, or over the physical layer uplink channel carrying HARQ information, or a combination thereof.

In some examples, the channel component 610 may identify, at the UE, a change in CSI pertaining to communications with the base station, where the CSI scheduling request is transmitted based on the identifying.

In some examples, the report component 615 may autonomously generate the CSI scheduling request. In some cases, the one or more dedicated resources that are different from scheduling request resources associated with scheduling requests for uplink transmissions other than a CSI report transmission. In some cases, the CSI scheduling request is a bit indication. In some cases, the CSI report includes an aperiodic CSI report. In some cases, the CSI report includes a semi-persistent CSI report.

The trigger component 620 may receive, from the base station, the CSI report trigger based on the CSI scheduling request. In some examples, the trigger component 620 may receive a second indication that the resources for the CSI report transmission have been activated or granted. In some examples, the trigger component 620 may detect the CSI scheduling request trigger. In some examples, the trigger component 620 may generate the CSI scheduling request based on the CSI scheduling request trigger.

In some examples, the trigger component 620 may identify a channel interference measurement associated with a preceding CSI report prior to the CSI report. In some examples, the trigger component 620 may compare the channel interference measurement associated with the preceding CSI report to one or more channel interference measurements associated with other previous CSI reports. In some examples, the trigger component 620 may receive one or more packets in accordance with an MCS. In some examples, the trigger component 620 may determine that the MCS satisfies a threshold based on a log-likelihood ratio associated with decoding the one or more packets, where generating the CSI scheduling request is based on determining that the MCS satisfies the threshold.

In some examples, the trigger component 620 may determine an uplink power level based on a maximum permissible exposure limit, where generating the CSI scheduling request is based on determining the uplink power level. In some examples, the trigger component 620 may receive one or more reservation signals in an unlicensed radio frequency spectrum band, the one or more reservation signals including channel interference information, where generating the CSI scheduling request is based on receiving the one or more reservation signals. In some examples, the trigger component 620 may determine power headroom information. In some examples, the trigger component 620 may determine that a power headroom associated with uplink communications satisfies a threshold based on the power headroom information, where generating the CSI scheduling request is based on the power headroom associated with the uplink communications satisfying the threshold. In some cases, the CSI report trigger includes DCI signaling or a MAC-CE signaling.

The trigger component 620 may receive signaling including a CSI scheduling request configuration from the base station, where transmitting the CSI scheduling request is based on the CSI scheduling request configuration. The trigger component 620 may identify one or more resources for the CSI scheduling request based on the CSI scheduling request configuration, where the one or more resources are preconfigured. In some examples, the trigger component 620 may transmit the CSI scheduling request on the one or more preconfigured resources. The trigger component 620 may determine, based on the CSI scheduling request configuration, a CSI scheduling request trigger, the CSI scheduling request configuration including a threshold value for the CSI or a parameter related to the CSI, or both. The trigger component 620 may generate the CSI scheduling request based on the CSI scheduling request trigger. The CSI scheduling request configuration may correspond to one or more directional beams transmitted by the base station.

The reference signal component 625 may transmit the CSI scheduling request via resources associated with one or more SRSs. In some examples, the reference signal component 625 may partition the resources associated with the one or more SRSs, where the partitioning includes an indication of a presence of the CSI scheduling request. In some examples, the reference signal component 625 may partition the one or more SRSs, where the partitioning of the one or more SRSs is an indication of an absence of the CSI scheduling request.

Figure 7:
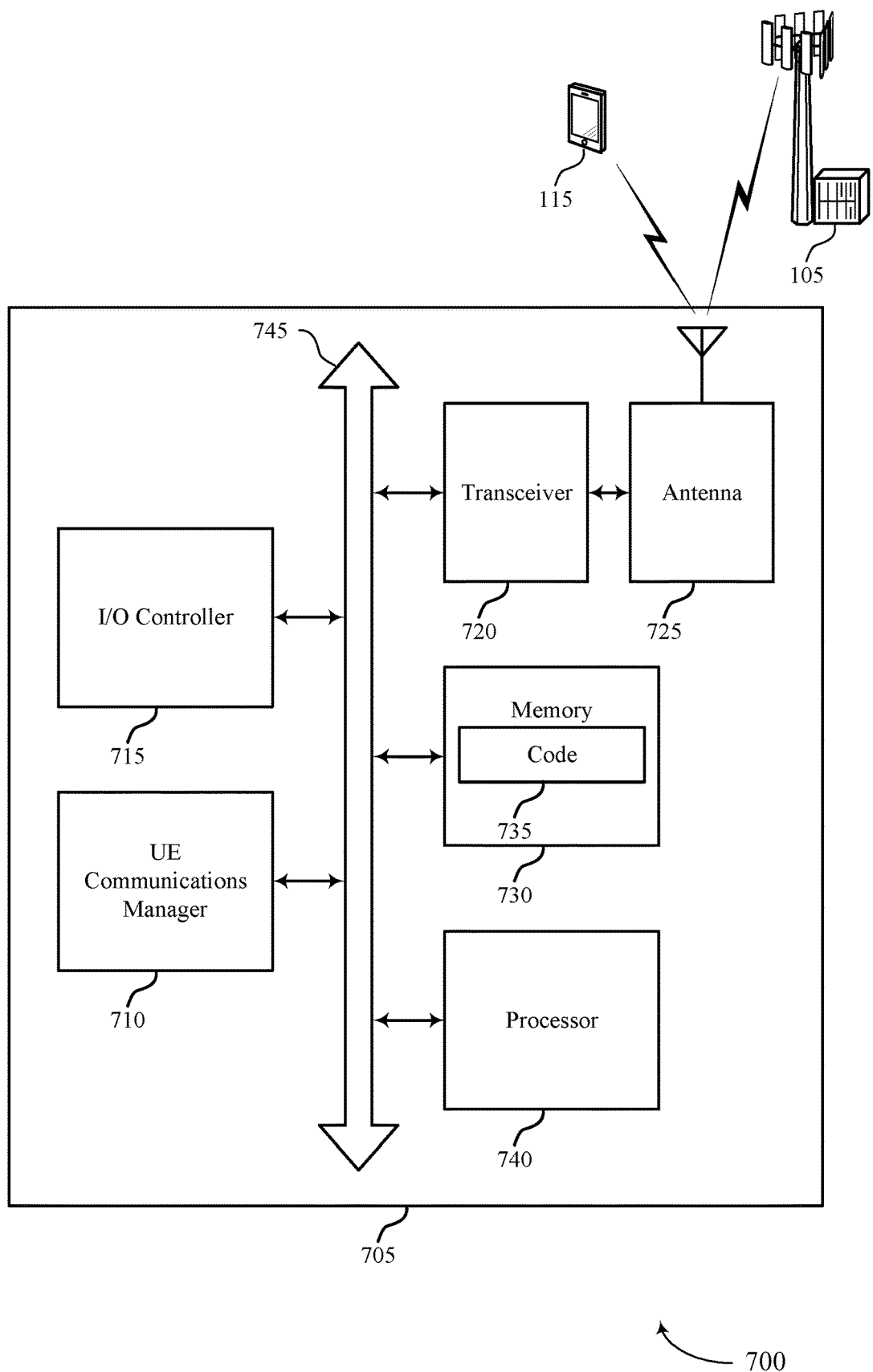
FIG. 7 shows a diagram of a system including a device that supports a CSI scheduling request in accordance with aspects of the present disclosure.

FIG. 7 shows a diagram of a system 700 including a device 705 that supports a CSI scheduling request in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may transmit, to a base station, a CSI scheduling request, receive, from the base station, a CSI report trigger based on the CSI scheduling request, and transmit, in response to receipt of the CSI report trigger, a CSI report over a physical layer uplink channel.

The device 705 may as described herein be implemented to realize one or more potential advantages. One implementation may allow the device 705 to save power and increase battery life by communicating with a base station 105 (as shown in FIG. 2) more efficiently. For example, the device 705 may extend a coverage for CSI reports. In addition, the device 705 may experience reduced complexity, better throughput through CSI reporting. Another implementation may promote higher reliability and lower latency communications at the device 705 due to CSI reporting flexibility of the device 705, as a result of supporting a CSI scheduling request, which may be a message from the device 705 to a base station (e.g., a gNB), to activate and grant resources to the device 705 for an aperiodic CSI report or a semi-persistent CSI report.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some examples, the device 705 may include a single antenna 725. However, in some other examples, the device 705 may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting CSI scheduling).

Figure 8:
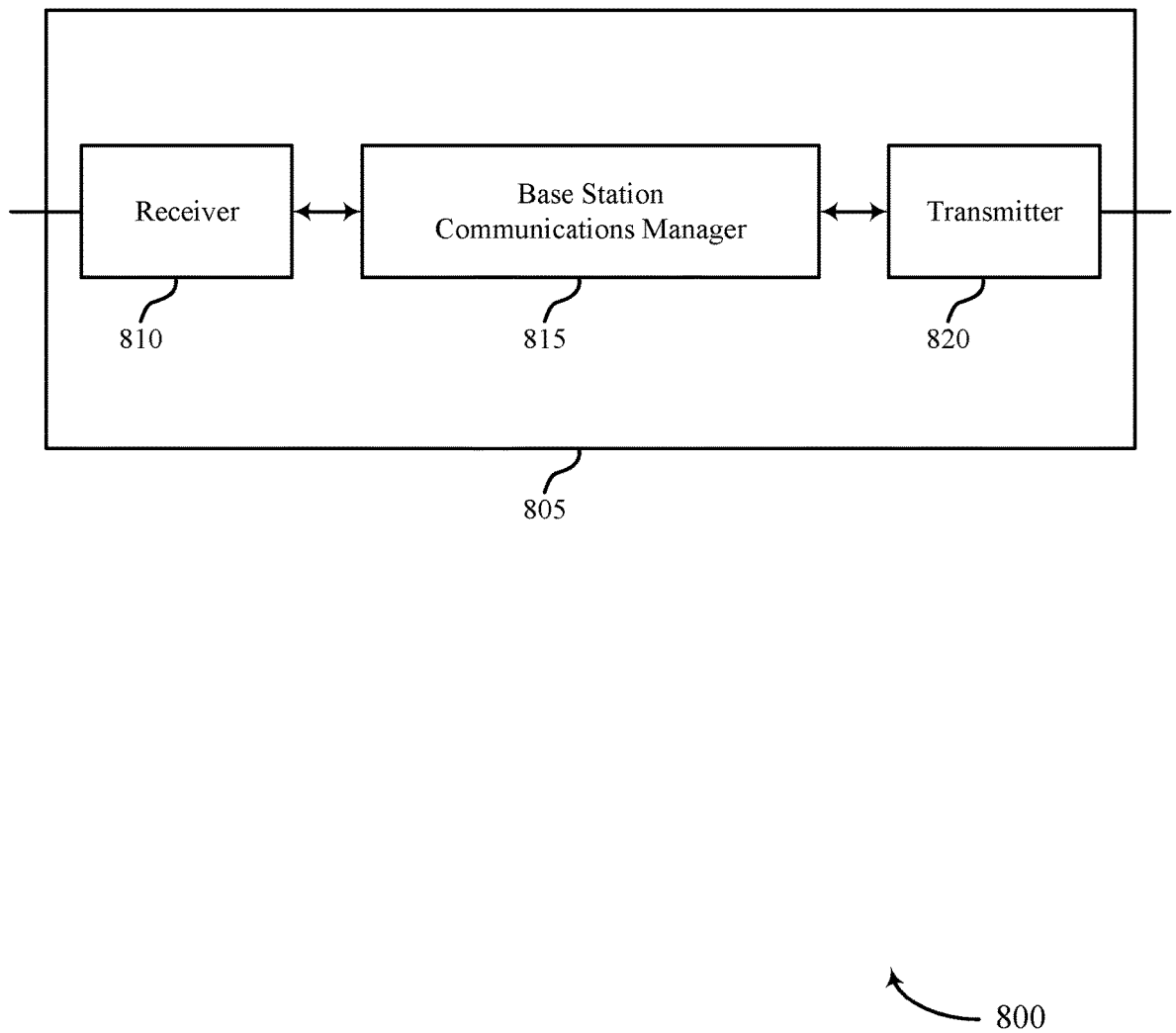
FIGS. 8 and 9 show block diagrams of devices that support a CSI scheduling request in accordance with aspects of the present disclosure.

FIG. 8 shows a block diagram 800 of a device 805 that supports a CSI scheduling request in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to CSI scheduling). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may receive a CSI scheduling request from a UE, receive, in response to the CSI report trigger, a CSI report over a physical layer uplink channel, and transmit a CSI report trigger based on the CSI scheduling request. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
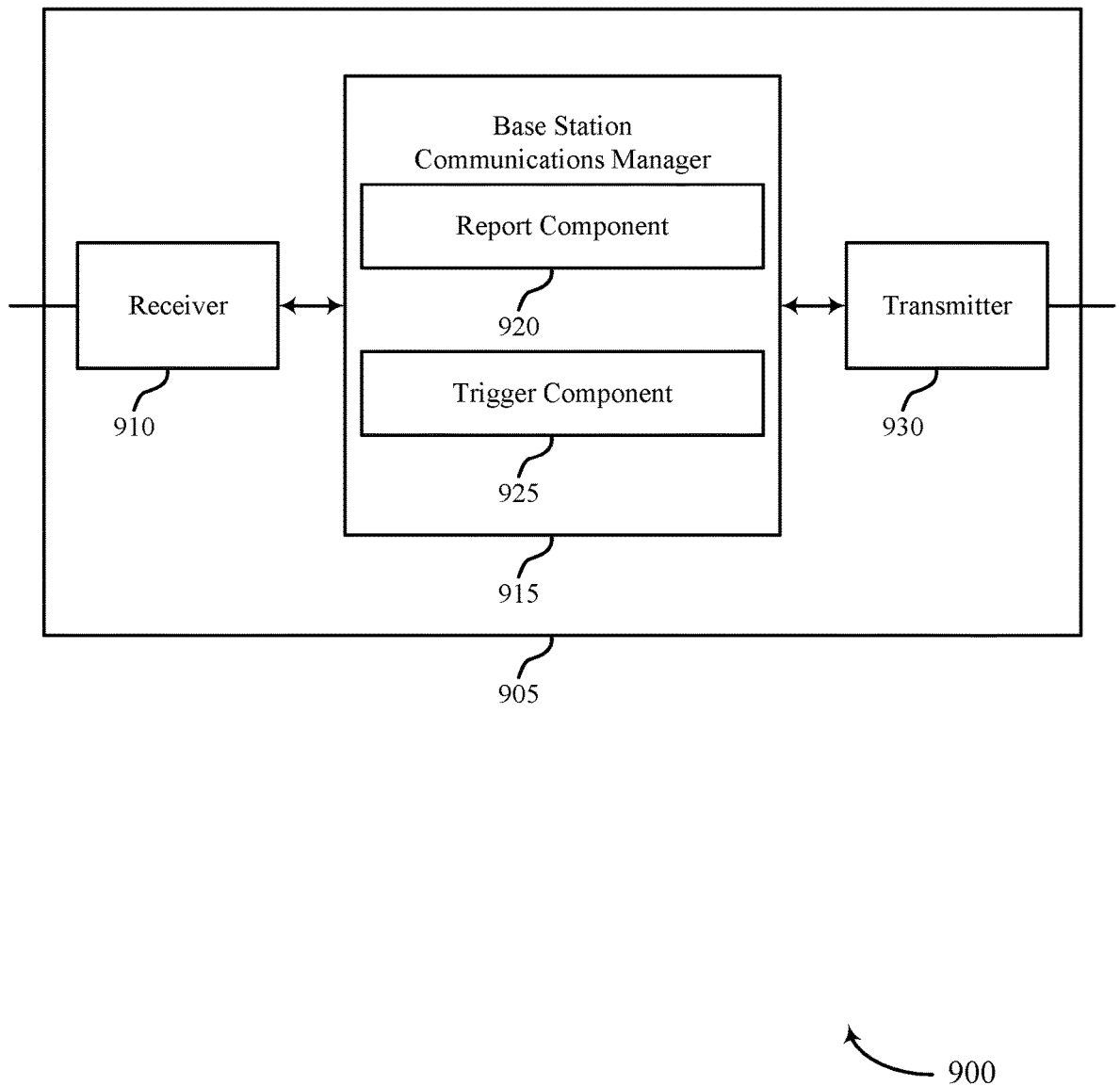

FIG. 9 shows a block diagram 900 of a device 905 that supports a CSI scheduling request in accordance with aspects of the present disclosure. The device 905 may be an example of aspects of a device 805, or a base station 105 as described herein. The device 905 may include a receiver 910, a base station communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to CSI scheduling). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a report component 920 and a trigger component 925. The base station communications manager 915 may be an example of aspects of the base station communications manager 1110 described herein.

The report component 920 may receive a CSI scheduling request from a UE and receive, in response to the CSI report trigger, a CSI report over a physical layer uplink channel.

The trigger component 925 may transmit a CSI report trigger based on the CSI scheduling request.

The transmitter 930 may transmit signals generated by other components of the device 905. In some examples, the transmitter 930 may be collocated with a receiver 910 in a transceiver component. For example, the transmitter 930 may be an example of aspects of the transceiver 1120 described with reference to FIG. 11. The transmitter 930 may utilize a single antenna or a set of antennas.

Figure 10:
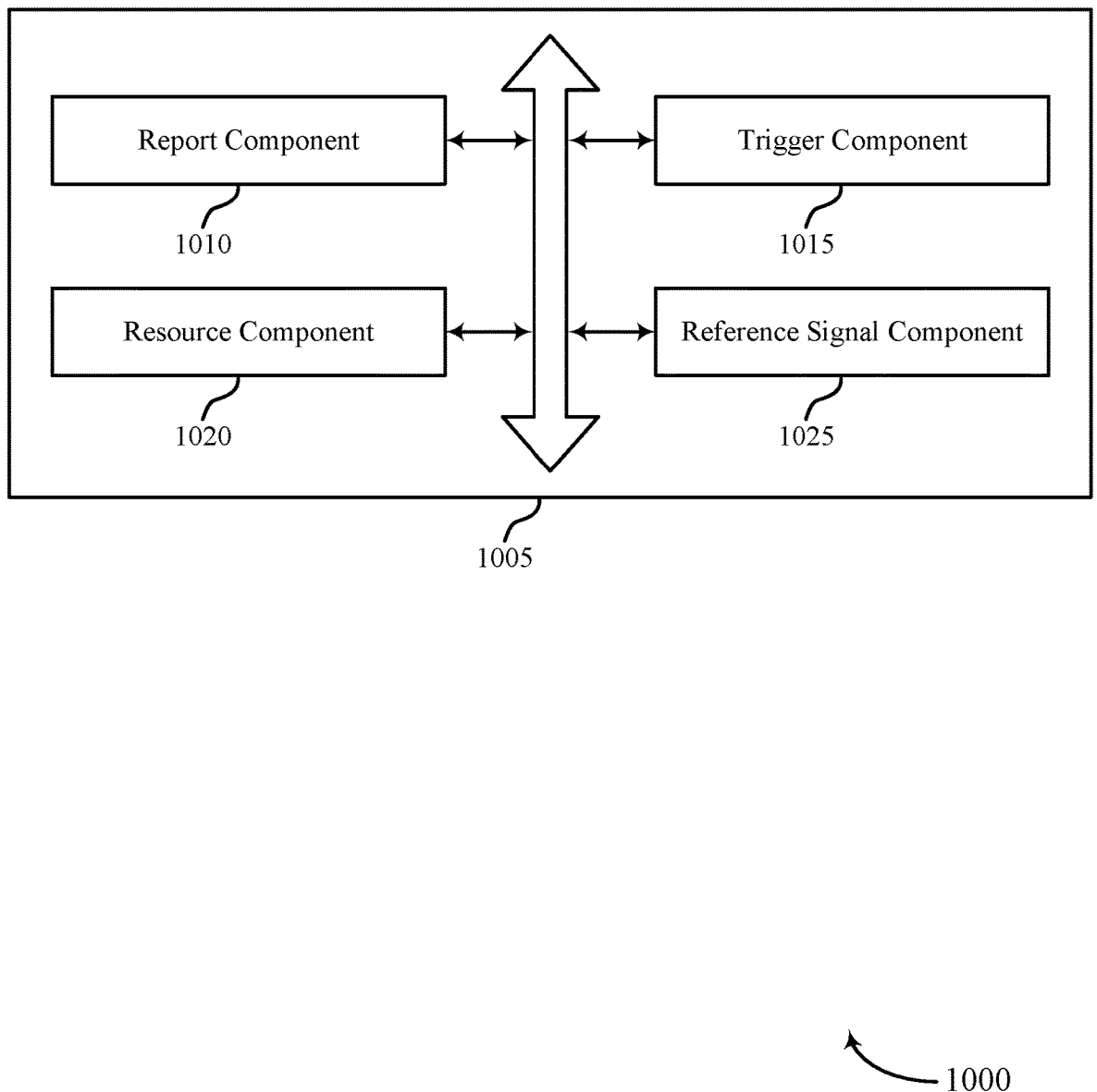
FIG. 10 shows a block diagram of a base station communications manager that supports a CSI scheduling request in accordance with aspects of the present disclosure.

FIG. 10 shows a block diagram 1000 of a base station communications manager 1005 that supports a CSI scheduling request in accordance with aspects of the present disclosure. The base station communications manager 1005 may be an example of aspects of a base station communications manager 815, a base station communications manager 915, or a base station communications manager 1110 described herein. The base station communications manager 1005 may include a report component 1010, a trigger component 1015, a resource component 1020, and a reference signal component 1025. Each of these components may communicate, directly or indirectly, with one another (e.g., via one or more buses).

The report component 1010 may receive a CSI scheduling request from a UE. In some examples, the report component 1010 may receive, in response to a CSI report trigger, a CSI report over a physical layer uplink channel (e.g., a PUSCH). In some examples, the report component 1010 may identify, in the CSI scheduling request, a first indication that the base station is to activate or grant resources for a CSI report transmission from the UE to the base station. In some cases, the CSI scheduling request is a bit indication. In some cases, the CSI report includes an aperiodic CSI report. In some cases, the CSI report includes a semi-persistent CSI report. The report component 1010 may transmit signaling including a CSI scheduling request configuration to the UE, where the CSI scheduling request configuration corresponds to one or more directional beams associated with the UE.

The trigger component 1015 may transmit the CSI report trigger based on the CSI scheduling request. In some cases, the CSI report trigger includes DCI signaling. In some cases, the CSI report trigger includes a MAC-CE signaling. The resource component 1020 may activate or granting the resources for the CSI report transmission. In some examples, the resource component 1020 may transmit a second indication that the resources for the CSI report transmission have been activated or granted. In some examples, the resource component 1020 may receive the CSI scheduling request on one or more dedicated resources or over the physical layer uplink channel carrying HARQ information, or a combination thereof. In some cases, the CSI scheduling request is transmitted in association with the one or more dedicated resources that are different from scheduling request resources associated with scheduling requests for uplink transmissions other than a CSI report transmission. The reference signal component 1025 may receive the CSI scheduling request via one or more SRSs. In some cases, a partition of the one or more SRSs is an indication of a presence of the CSI scheduling request. In some cases, a partition of the one or more SRSs is an indication of an absence of the CSI scheduling request.

Figure 11:
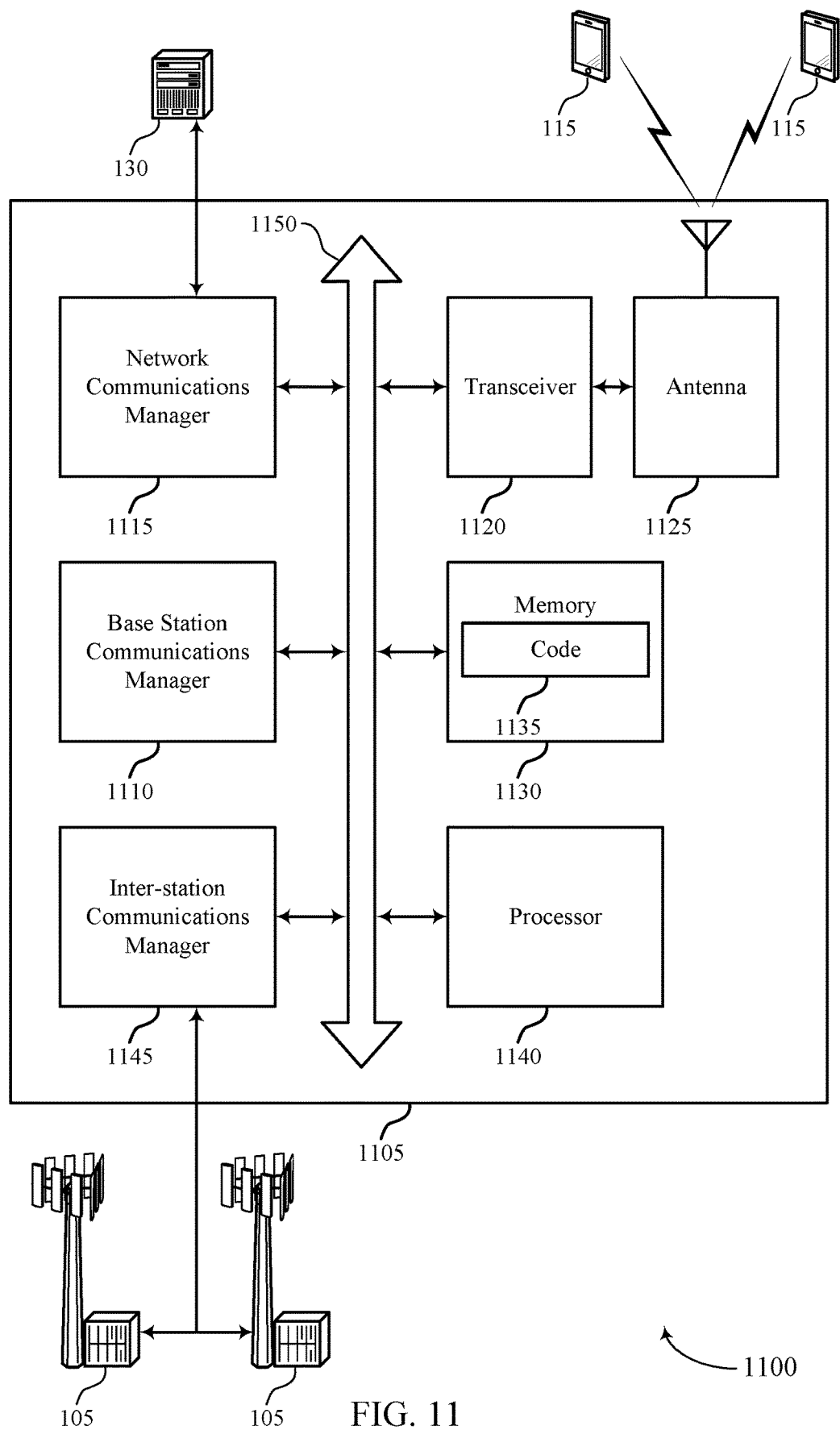
FIG. 11 shows a diagram of a system including a device that supports a CSI scheduling request in accordance with aspects of the present disclosure.

FIG. 11 shows a diagram of a system 1100 including a device 1105 that supports a CSI scheduling request in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may receive a CSI scheduling request from a UE, receive, in response to the CSI report trigger, a CSI report over a physical layer uplink channel (e.g., a PUSCH), and transmit a CSI report trigger based on the CSI scheduling request. The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some examples, the device 1105 may include a single antenna 1125. However, in some examples, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices. The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some examples, a memory controller may be integrated into processor 1140. The processor 1140 may be configured to execute computer-readable instructions stored in a memory (e.g., the memory 1130) to cause the device 1105 to perform various functions (e.g., functions or tasks supporting CSI scheduling).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
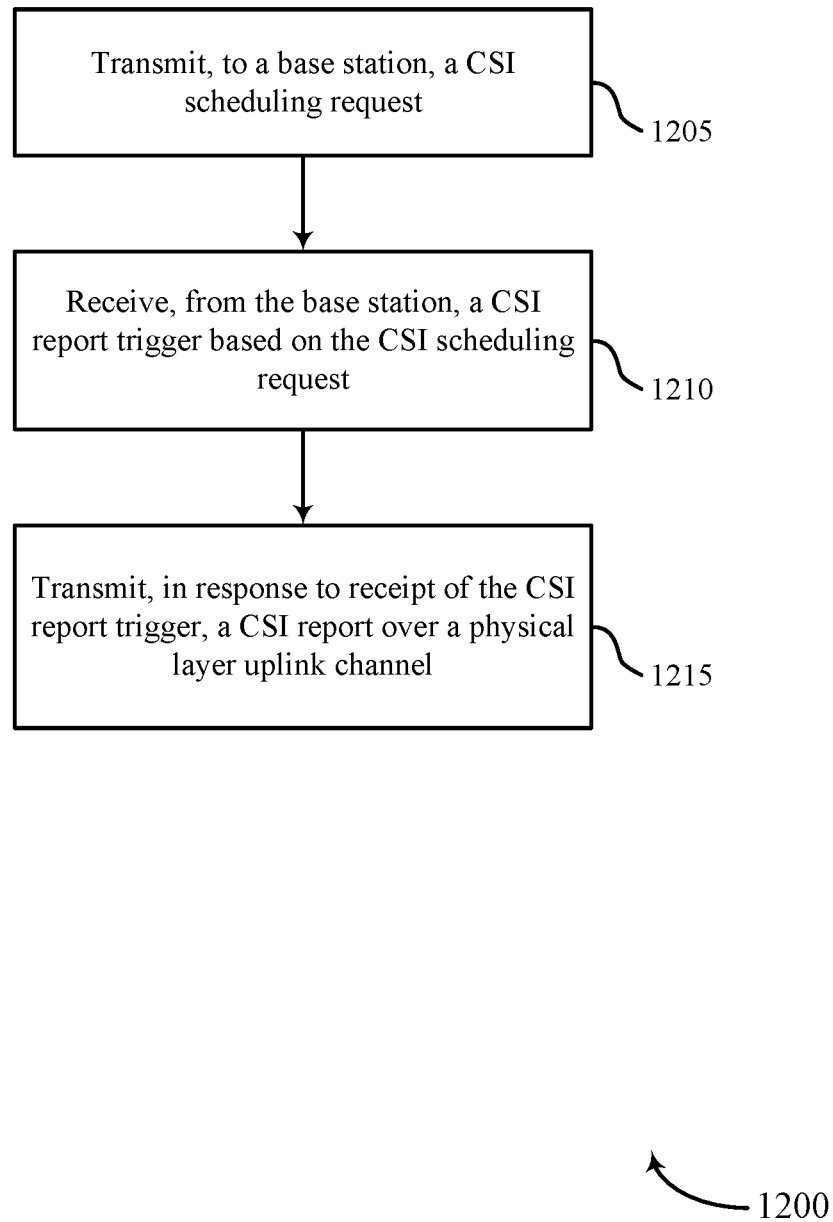
FIGS. 12 through 16 show flowcharts illustrating methods that support a CSI scheduling request in accordance with aspects of the present disclosure.

FIG. 12 shows a flowchart illustrating a method 1200 that supports a CSI scheduling request in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit, to the base station, a CSI scheduling request. The operations of 1210 may be performed according to the methods described herein. In some examples, aspects of the operations of 1210 may be performed by a report component as described with reference to FIGS. 4 through 7.

At 1210, the UE may receive, from the base station, a CSI report trigger based on the CSI scheduling request. The operations of 1215 may be performed according to the methods described herein. In some examples, aspects of the operations of 1215 may be performed by a trigger component as described with reference to FIGS. 4 through 7.

At 1215, the UE may transmit, in response to receipt of the CSI report trigger, a CSI report over a physical layer uplink channel. The operations of 1220 may be performed according to the methods described herein. In some examples, aspects of the operations of 1220 may be performed by a report component as described with reference to FIGS. 4 through 7.

Figure 13:
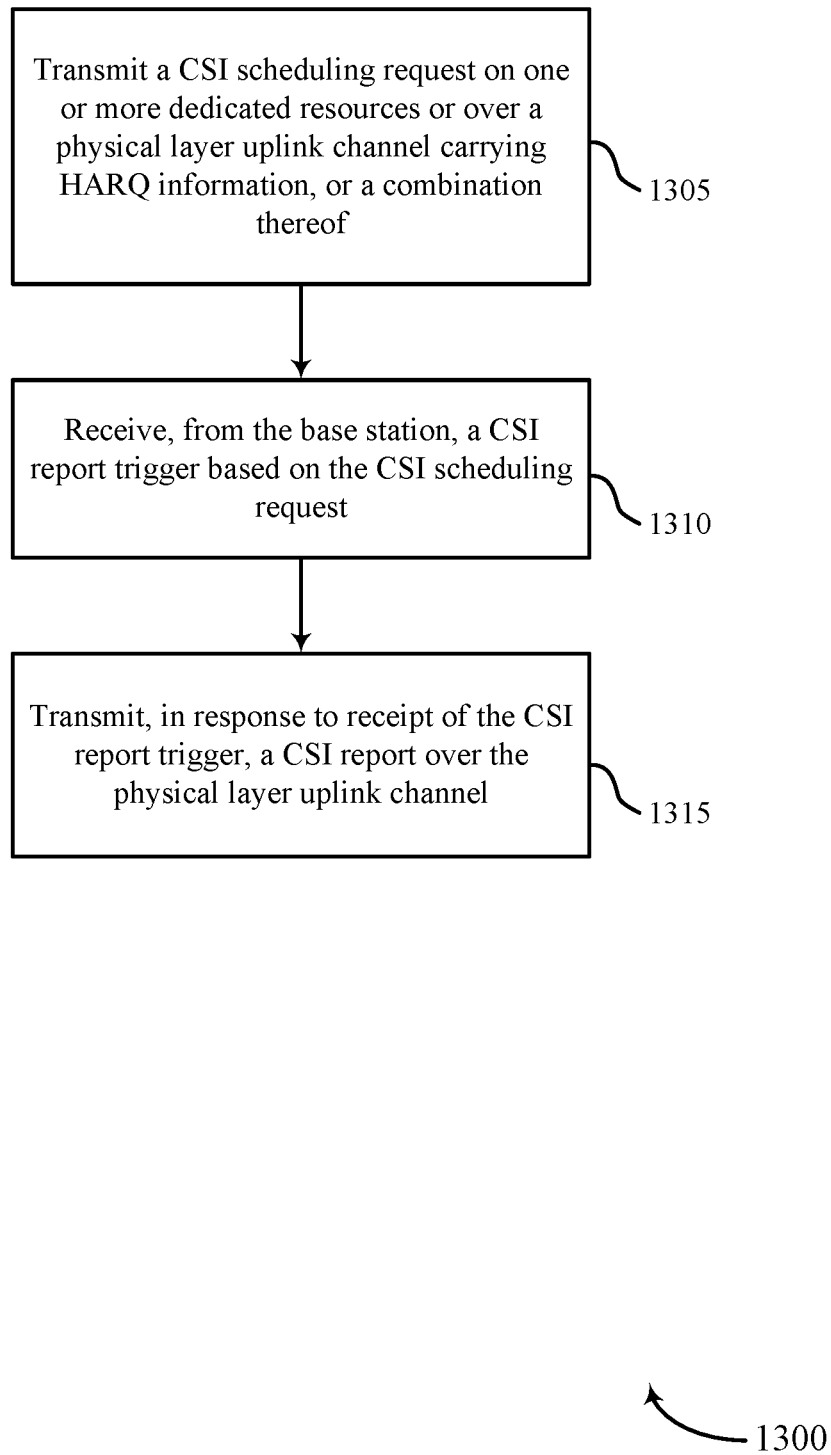

FIG. 13 shows a flowchart illustrating a method 1300 that supports a CSI scheduling request in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a CSI scheduling request on one or more dedicated resources, or over a physical layer uplink channel carrying HARQ information, or a combination thereof. The operations of 1310 may be performed according to the methods described herein. In some examples, aspects of the operations of 1310 may be performed by a report component as described with reference to FIGS. 4 through 7.

At 1310, the UE may receive, from the base station, a CSI report trigger based on the CSI scheduling request. The operations of 1315 may be performed according to the methods described herein. In some examples, aspects of the operations of 1315 may be performed by a trigger component as described with reference to FIGS. 4 through 7.

At 1315, the UE may transmit, in response to receipt of the CSI report trigger, a CSI report over the physical layer uplink channel (e.g., the PUSCH or PUCCH). The operations of 1320 may be performed according to the methods described herein. In some examples, aspects of the operations of 1320 may be performed by a report component as described with reference to FIGS. 4 through 7.

Figure 14:
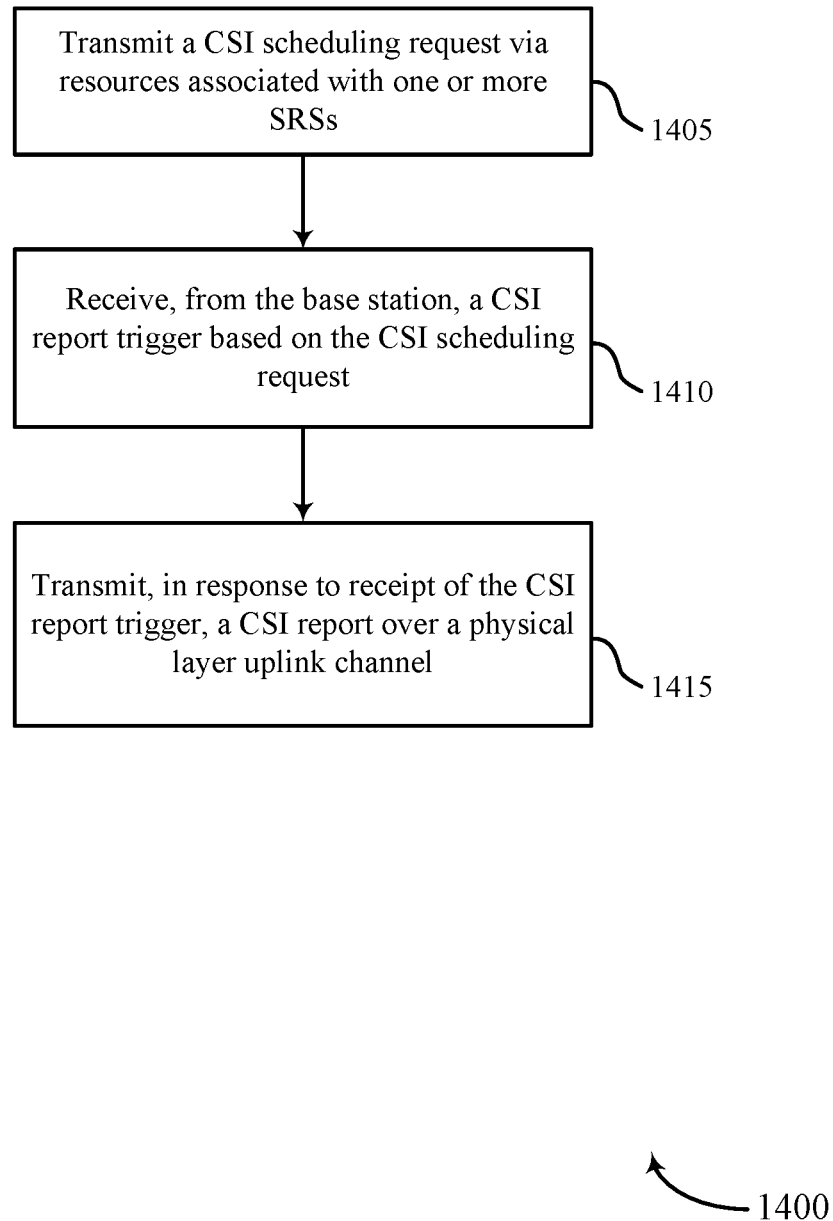

FIG. 14 shows a flowchart illustrating a method 1400 that supports a CSI scheduling request in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may transmit the CSI scheduling request via resources associated with one or more SRSs. The operations of 1410 may be performed according to the methods described herein. In some examples, aspects of the operations of 1410 may be performed by a reference signal component as described with reference to FIGS. 4 through 7.

At 1410, the UE may receive, from the base station, a CSI report trigger based on the CSI scheduling request. The operations of 1415 may be performed according to the methods described herein. In some examples, aspects of the operations of 1415 may be performed by a trigger component as described with reference to FIGS. 4 through 7.

At 1415, the UE may transmit, in response to receipt of the CSI report trigger, a CSI report over a physical layer uplink channel. The operations of 1420 may be performed according to the methods described herein. In some examples, aspects of the operations of 1420 may be performed by a report component as described with reference to FIGS. 4 through 7.

Figure 15:
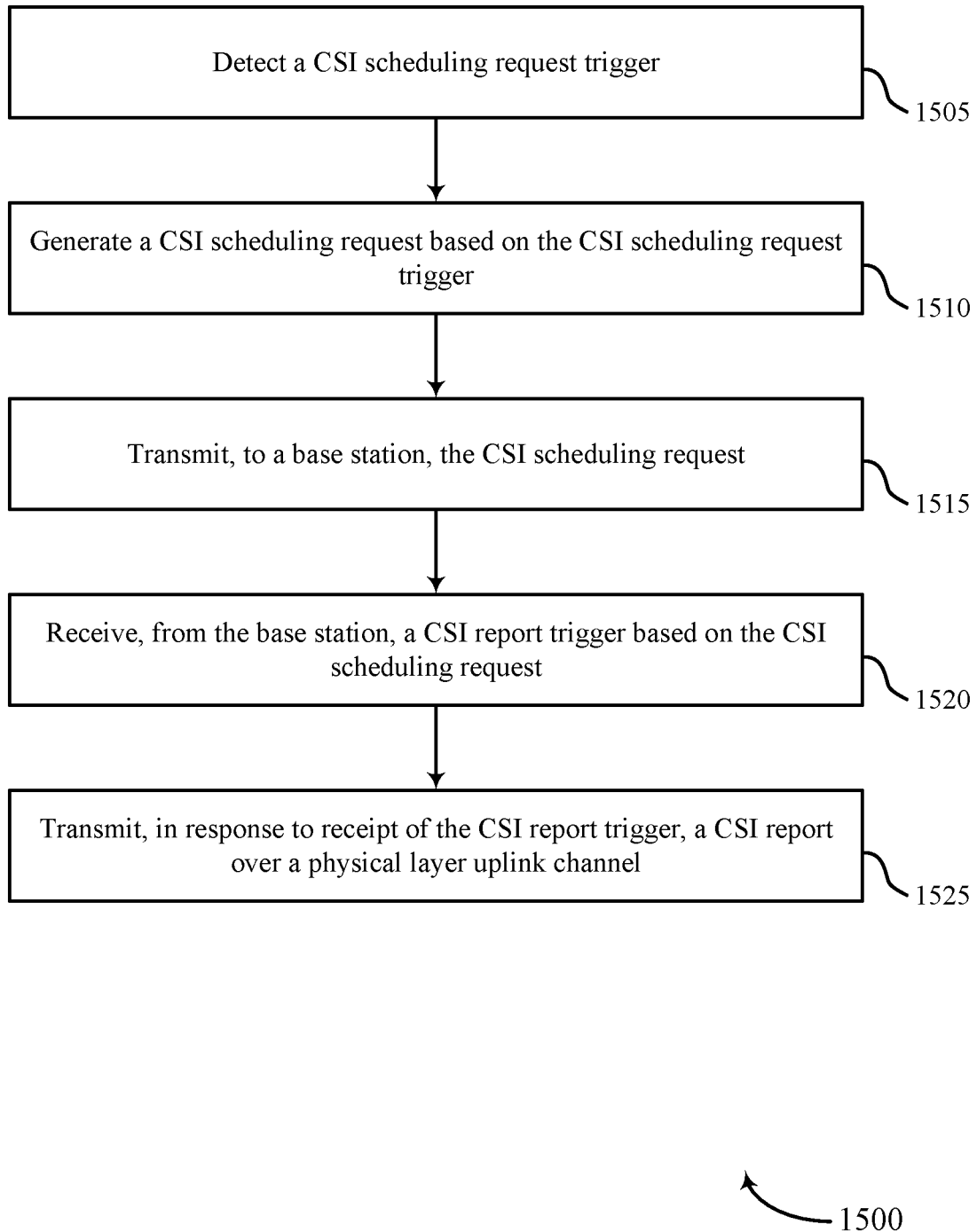

FIG. 15 shows a flowchart illustrating a method 1500 that supports a CSI scheduling request in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may detect a CSI scheduling request trigger. The operations of 1505 may be performed according to the methods described herein. In some examples, aspects of the operations of 1505 may be performed by a trigger component as described with reference to FIGS. 4 through 7.

At 1510, the UE may generate a CSI scheduling request based on the CSI scheduling request trigger. The operations of 1510 may be performed according to the methods described herein. In some examples, aspects of the operations of 1510 may be performed by a trigger component as described with reference to FIGS. 4 through 7.

At 1515, the UE may transmit, to a base station, the CSI scheduling request. The operations of 1515 may be performed according to the methods described herein. In some examples, aspects of the operations of 1515 may be performed by a report component as described with reference to FIGS. 4 through 7.

At 1520, the UE may receive, from the base station, a CSI report trigger based on the CSI scheduling request. The operations of 1520 may be performed according to the methods described herein. In some examples, aspects of the operations of 1520 may be performed by a trigger component as described with reference to FIGS. 4 through 7.

At 1525, the UE may transmit, in response to receipt of the CSI report trigger, a CSI report over a physical layer uplink channel. The operations of 1525 may be performed according to the methods described herein. In some examples, aspects of the operations of 1525 may be performed by a report component as described with reference to FIGS. 4 through 7.

Figure 16:
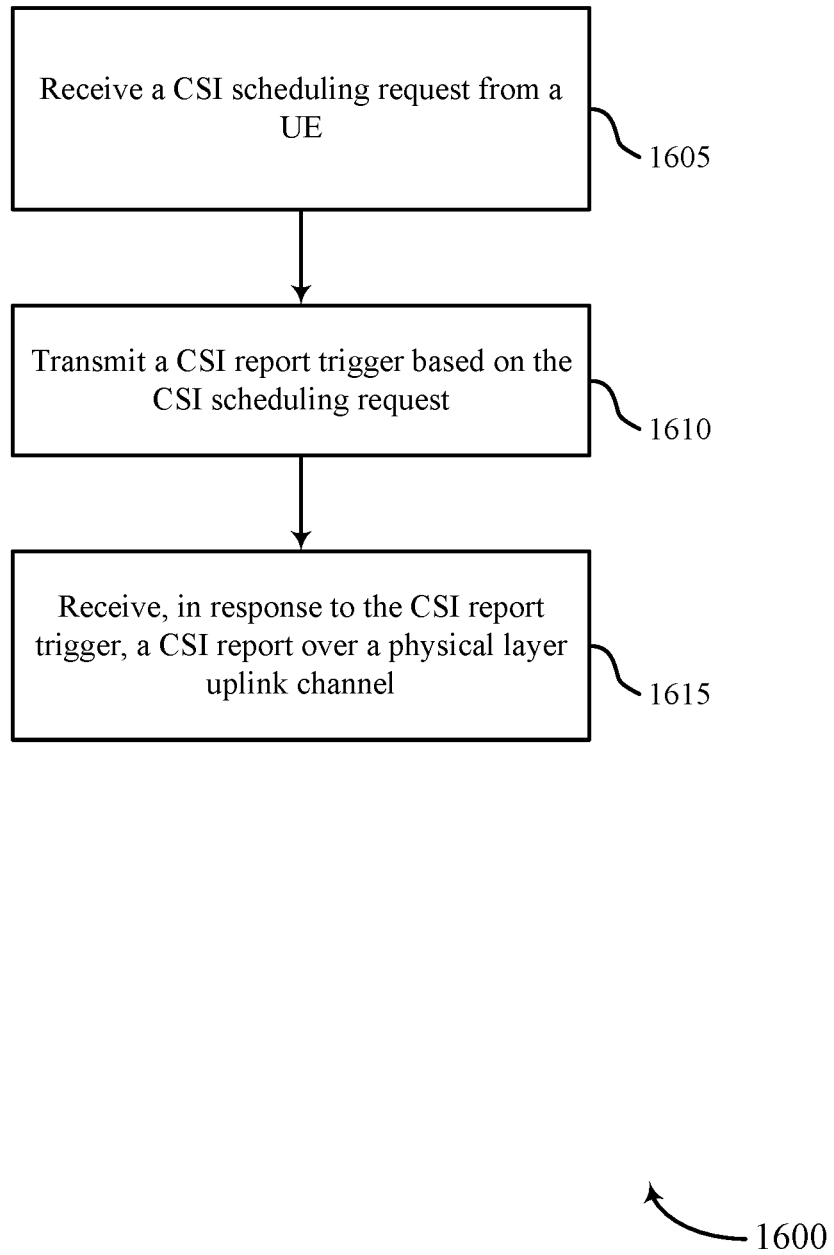

FIG. 16 shows a flowchart illustrating a method 1600 that supports a CSI scheduling request in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may receive a CSI scheduling request from a UE. The operations of 1605 may be performed according to the methods described herein. In some examples, aspects of the operations of 1605 may be performed by a report component as described with reference to FIGS. 8 through 11.

At 1610, the base station may transmit a CSI report trigger based on the CSI scheduling request. The operations of 1610 may be performed according to the methods described herein. In some examples, aspects of the operations of 1610 may be performed by a trigger component as described with reference to FIGS. 8 through 11.

At 1615, the base station may receive, in response to the CSI report trigger, a CSI report over a physical layer uplink channel. The operations of 1615 may be performed according to the methods described herein. In some examples, aspects of the operations of 1615 may be performed by a report component as described with reference to FIGS. 8 through 11.

The following provides an overview of aspects of the present disclosure:

Aspect 1: A method for wireless communication at a UE, comprising: transmitting, to a base station, a CSI scheduling request; receiving, from the base station, a CSI report trigger based at least in part on the CSI scheduling request; and transmitting, in response to receipt of the CSI report trigger, a CSI report over a physical layer uplink channel.

Aspect 2: The method of aspect 1, further comprising: identifying, at the UE, a change in CSI pertaining to communications with the base station, wherein the CSI scheduling request is transmitted based on the identifying.

Aspect 3: The method of any of aspects 1 through 2, further comprising: including, in the CSI scheduling request, a first indication that the base station is to activate or grant resources for a CSI report transmission from the UE to the base station.

Aspect 4: The method of aspect 3, wherein receiving the CSI report trigger comprises: receiving a second indication that the resources for the CSI report transmission have been activated or granted.

Aspect 5: The method of any of aspects 1 through 4, wherein transmitting the CSI scheduling request comprises: transmitting the CSI scheduling request on one or more dedicated resources or over the physical layer uplink channel carrying HARQ information, or a combination thereof Aspect 6: The method of aspect 5, wherein the one or more dedicated resources are different from scheduling request resources associated with scheduling requests for uplink transmissions other than a CSI report transmission.

Aspect 7: The method of any of aspects 1 through 6, wherein the CSI scheduling request is a bit indication.

Aspect 8: The method of any of aspects 1 through 7, wherein the CSI report trigger comprises DCI signaling or a MAC-CE signaling.

Aspect 9: The method of any of aspects 1 through 8, wherein transmitting the CSI scheduling request comprises: transmitting the CSI scheduling request via resources associated with one or more sounding reference signals.

Aspect 10: The method of aspect 9, further comprising: partitioning the resources associated with the one or more sounding reference signals, wherein the partitioning includes an indication of a presence of the CSI scheduling request.

Aspect 11: The method of any of aspects 1 through 10, further comprising: autonomously generating the CSI scheduling request.

Aspect 12: The method of any of aspects 1 through 10, further comprising: detecting a CSI scheduling request trigger; and generating the CSI scheduling request based at least in part on the CSI scheduling request trigger.

Aspect 13: The method of aspect 12, wherein detecting the CSI scheduling request trigger comprises: identifying a channel interference measurement associated with a preceding CSI report prior to the CSI report; and comparing the channel interference measurement associated with the preceding CSI report to one or more channel interference measurements associated with other previous CSI reports.

Aspect 14: The method of any of aspects 12 and 13, wherein detecting the CSI scheduling request trigger comprises: receiving one or more packets in accordance with a modulation and coding scheme; and determining that the modulation and coding scheme satisfies a threshold based at least in part on a log-likelihood ratio associated with decoding the one or more packets, wherein generating the CSI scheduling request is based at least in part on determining that the modulation and coding scheme satisfies the threshold.

Aspect 15: The method of any of aspects 12 through 14, wherein detecting the CSI scheduling request trigger comprises: determining an uplink power level based at least in part on a maximum permissible exposure limit, wherein generating the CSI scheduling request is based at least in part on determining the uplink power level.

Aspect 16: The method of any of aspects 12 through 15, wherein detecting the CSI scheduling request trigger comprises: receiving one or more reservation signals in an unlicensed radio frequency spectrum band, the one or more reservation signals comprising channel interference information, wherein generating the CSI scheduling request is based at least in part on receiving the one or more reservation signals.

Aspect 17: The method of any of aspects 12 through 16, wherein detecting the CSI scheduling request trigger comprises: determining power headroom information; and determining that a power headroom associated with uplink communications satisfies a threshold based at least in part on the power headroom information, wherein generating the CSI scheduling request is based at least in part on the power headroom associated with the uplink communications satisfying the threshold.

Aspect 18: The method of any of aspects 1 through 17, wherein the CSI report comprises an aperiodic CSI report.

Aspect 19: The method of any of aspects 1 through 18, wherein the CSI report comprises a semi-persistent CSI report.

Aspect 20: The method of any of aspects 1 through 19, further comprising: receiving signaling comprising a CSI scheduling request configuration from the base station, wherein transmitting the CSI scheduling request is based at least in part on the CSI scheduling request configuration.

Aspect 21: The method of aspect 20, further comprising: identifying one or more resources for the CSI scheduling request based at least in part on the CSI scheduling request configuration, the one or more resources are preconfigured, wherein transmitting the CSI scheduling request comprises: transmitting the CSI scheduling request on the one or more preconfigured resources.

Aspect 22: The method of any of aspects 20 and 21, further comprising: determining, based at least in part on the CSI scheduling request configuration, a CSI scheduling request trigger, the CSI scheduling request configuration comprising a threshold value for the CSI or a parameter related to the CSI, or both; and generating the CSI scheduling request based at least in part on the CSI scheduling request trigger Aspect 23: The method of any of aspects 20 through 22, wherein the CSI scheduling request configuration corresponds to one or more directional beams transmitted by the base station.

Aspect 24: A method for wireless communication at a base station, comprising: receiving a CSI scheduling request from a UE; transmitting a CSI report trigger based at least in part on the CSI scheduling request; and receiving, in response to the CSI report trigger, a CSI report over a physical layer uplink channel.

Aspect 25: The method of aspect 24, further comprising: identifying, in the CSI scheduling request, a first indication that the base station is to activate or grant resources for a CSI report transmission from the UE to the base station; and activating or granting the resources for the CSI report transmission.

Aspect 26: The method of aspect 25, wherein transmitting the CSI report trigger comprises: transmitting a second indication that the resources for the CSI report transmission have been activated or granted.

Aspect 27: The method of any of aspects 24 through 26, wherein receiving the CSI scheduling request comprises: receiving the CSI scheduling request on one or more dedicated resources or over the physical layer uplink channel carrying HARQ information, or a combination thereof Aspect 28: The method of aspect 27, wherein the CSI scheduling request is transmitted in association with the one or more dedicated resources that are different from scheduling request resources associated with scheduling requests for uplink transmissions other than a CSI report transmission.

Aspect 29: The method of any of aspects 24 through 28, wherein the CSI scheduling request is a bit indication.

Aspect 30: The method of any of aspects 24 through 29, wherein the CSI report trigger comprises downlink control information signaling.

Aspect 31: The method of any of aspects 24 through 30, wherein the CSI report trigger comprises a medium access control-control element signaling.

Aspect 32: The method of any of aspects 24 through 31, wherein receiving the CSI scheduling request comprises: receiving the CSI scheduling request via one or more sounding reference signals.

Aspect 33: The method of aspect 32, wherein a partition of the one or more sounding reference signals is an indication of a presence of the CSI scheduling request.

Aspect 34: The method of any of aspects 32 and 33, wherein a partition of the one or more sounding reference signals is an indication of an absence of the CSI scheduling request.

Aspect 35: The method of any of aspects 24 through 34, wherein the CSI report comprises an aperiodic CSI report.

Aspect 36: The method of any of aspects 24 through 35, wherein the CSI report comprises a semi-persistent CSI report.

Aspect 37: The method of any of aspects 24 through 36, further comprising: transmitting signaling comprising a CSI scheduling request configuration to the UE, wherein receiving the CSI scheduling request is based at least in part on the CSI scheduling request configuration.

Aspect 38: The method of aspect 37, wherein the CSI scheduling request configuration corresponds to one or more directional beams associated with the UE.

Aspect 39: An apparatus for wireless communication at a UE, comprising a processor; memory coupled with the processor; and instructions stored in the memory and executable by the processor to cause the apparatus to perform a method of any of aspects 1 through 23.

Aspect 40: An apparatus for wireless communication at a UE, comprising at least one means for performing a method of any of aspects 1 through 23.

Aspect 41: A non-transitory computer-readable medium storing code for wireless communication at a UE, the code comprising instructions executable by a processor to perform a method of any of aspects 1 through 23.

Aspect 42: An apparatus for wireless communication at a base station, comprising a processor; memory coupled with the processor; and instructions stored in the memory and executable by the processor to cause the apparatus to perform a method of any of aspects 24 through 38.

Aspect 43: An apparatus for wireless communication at a base station, comprising at least one means for performing a method of any of aspects 24 through 38.

Aspect 44: A non-transitory computer-readable medium storing code for wireless communication at a base station, the code comprising instructions executable by a processor to perform a method of any of aspects 24 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving signaling comprising a channel state information scheduling request configuration from a network device, the channel state information scheduling request configuration configuring the UE with one or more channel state information scheduling request triggers that trigger transmission, by the UE, of a channel state information scheduling request that requests that the network device provides a grant for a channel state information report that includes channel state information associated with a communication link between the UE and the network device;

transmitting, to the network device, the channel state information scheduling request based at least in part on the UE detecting occurrence of at least one channel state information scheduling request trigger indicated in the channel state information scheduling request configuration;

receiving, from the network device, a channel state information report trigger, wherein the channel state information report trigger is the grant or activates the grant scheduling the channel state information report based at least in part on the channel state information scheduling request; and transmitting, in response to the channel state information report trigger, the channel state information report over a physical layer uplink channel.

2. The method of claim 1, further comprising:
identifying, at the UE, a change in the channel state information pertaining to communications with the network device, wherein the channel state information scheduling request is transmitted based on the identifying.

3. The method of claim 1, wherein transmitting the channel state information scheduling request comprises:
transmitting the channel state information scheduling request on one or more dedicated resources, or over the physical layer uplink channel carrying hybrid automatic repeat request information, or a combination thereof.

4. The method of claim 3, wherein the one or more dedicated resources are different from scheduling request resources associated with scheduling requests for uplink transmissions other than a channel state information report transmission.

5. The method of claim 1, wherein the channel state information scheduling request is a bit indication.

6. The method of claim 1, wherein the grant comprises downlink control information signaling or a medium access control-control element signaling.

7. The method of claim 1, wherein transmitting the channel state information scheduling request comprises:
transmitting the channel state information scheduling request via resources associated with one or more sounding reference signals.

8. The method of claim 7, further comprising:
partitioning the resources associated with the one or more sounding reference signals, wherein the partitioning comprises an indication of a presence of the channel state information scheduling request.

9. The method of claim 1, further comprising:
autonomously generating the channel state information scheduling request.

10. The method of claim 1, further comprising:
detecting the at least one channel state information scheduling request trigger; and
generating the channel state information scheduling request based at least in part on the at least one channel state information scheduling request trigger.

11. The method of claim 10, wherein detecting the at least one channel state information scheduling request trigger comprises:
identifying a channel interference measurement associated with a preceding channel state information report prior to the channel state information report; and
comparing the channel interference measurement associated with the preceding channel state information report to one or more channel interference measurements associated with other previous channel state information reports.

12. The method of claim 10, wherein detecting the at least one channel state information scheduling request trigger comprises:
receiving one or more packets in accordance with a modulation and coding scheme; and
determining that the modulation and coding scheme satisfies a threshold based at least in part on a log-likelihood ratio associated with decoding the one or more packets, wherein generating the channel state information scheduling request is based at least in part on determining that the modulation and coding scheme satisfies the threshold.

13. The method of claim 10, wherein detecting the at least one channel state information scheduling request trigger comprises:
determining an uplink power level based at least in part on a maximum permissible exposure limit, wherein generating the channel state information scheduling request is based at least in part on determining the uplink power level.

14. The method of claim 10, wherein detecting the at least one channel state information scheduling request trigger comprises:
receiving one or more reservation signals in an unlicensed radio frequency spectrum band, the one or more reservation signals comprising channel interference information, wherein generating the channel state information scheduling request is based at least in part on receiving the one or more reservation signals.

15. The method of claim 10, wherein detecting the at least one channel state information scheduling request trigger comprises:
determining power headroom information; and
determining that a power headroom associated with uplink communications satisfies a threshold based at least in part on the power headroom information, wherein generating the channel state information scheduling request is based at least in part on the power headroom associated with the uplink communications satisfying the threshold.

16. The method of claim 1, wherein the channel state information report comprises an aperiodic channel state information report.

17. The method of claim 1, wherein the channel state information report comprises a semi-persistent channel state information report.

18. The method of claim 1, further comprising:
identifying one or more resources for the channel state information scheduling request based at least in part on the channel state information scheduling request configuration, the one or more resources are preconfigured, wherein transmitting the channel state information scheduling request comprises:
transmitting the channel state information scheduling request on the one or more preconfigured resources.

19. The method of claim 1, further comprising:
determining, based at least in part on the channel state information scheduling request configuration, the at least one channel state information scheduling request trigger, the channel state information scheduling request configuration comprising a threshold value for the channel state information or a parameter related to the channel state information, or both; and generating the channel state information scheduling request based at least in part on the at least one channel state information scheduling request trigger.

20. The method of claim 1, wherein the channel state information scheduling request configuration corresponds to one or more directional beams transmitted by the network device.

21. A user equipment (UE) for wireless communication, comprising:
a processor,
memory coupled with the processor; and
instructions stored in the memory and executable by the processor to cause the UE to:
receive signaling comprising a channel state information scheduling request configuration from a network device, the channel state information scheduling request configuration configuring the UE with one or more channel state information scheduling request triggers that trigger transmission, by the UE, of a channel state information scheduling request that requests that the network device provides a grant for a channel state information report that includes channel state information associated with a communication link between the UE and the network device;
transmit, to the network device, the channel state information scheduling request based at least in part on the UE detecting occurrence of at least one channel state information scheduling request trigger indicated in the channel state information scheduling request configuration;
receive, from the network device, a channel state information report trigger, wherein the channel state information report trigger is the grant or activates the grant scheduling the channel state information report based at least in part on the channel state information scheduling request; and
transmit, in response to the channel state information report trigger, the channel state information report over a physical layer uplink channel.

22. The UE of claim 21, wherein the instructions are executable by the processor to cause the UE to:
identify, at the UE, a change in the channel state information pertaining to communications with the network device, wherein the channel state information scheduling request is transmitted based on the identifying.

23. The UE of claim 21, wherein the instructions to transmit the channel state information scheduling request are executable by the processor to cause the UE to:
transmit the channel state information scheduling request on one or more dedicated resources or over the physical layer uplink channel carrying hybrid automatic repeat request information, or a combination thereof.

24. The UE of claim 21, wherein the instructions to transmit the channel state information scheduling request are executable by the processor to cause the UE to:
transmit the channel state information scheduling request via resources associated with one or more sounding reference signals.

25. The UE of claim 21, wherein the instructions are executable by the processor to cause the UE to:
detect the at least one channel state information scheduling request trigger; and
generate the channel state information scheduling request based at least in part on the at least one channel state information scheduling request trigger.

26. A user equipment (UE) apparatus for wireless communication, comprising:
means for receiving signaling comprising a channel state information scheduling request configuration from a network device, the channel state information scheduling request configuration configuring the UE with one or more channel state information scheduling request triggers that trigger transmission, by the UE, of a channel state information scheduling request that requests that the network device provides a grant for a channel state information report that includes channel state information associated with a communication link between the UE and the network device;
means for transmitting, to the network device, the channel state information scheduling request based at least in part on the UE detecting occurrence of at least one channel state information scheduling request trigger indicated in the channel state information scheduling request configuration;
means for receiving, from the network device, a channel state information report trigger, wherein the channel state information report trigger is the grant or activates the grant scheduling the channel state information report based at least in part on the channel state information scheduling request; and
means for transmitting, in response to the channel state information report, the channel state information report over a physical layer uplink channel.

27. A non-transitory computer-readable medium storing code for wireless communication at a user equipment (UE), the code comprising instructions executable by a processor to:
receive signaling comprising a channel state information scheduling request configuration from a network device, the channel state information scheduling request configuration configuring the UE with one or more channel state information scheduling request triggers that trigger transmission, by the UE, of a channel state information scheduling request that requests that the network device provides a grant for a channel state information report that includes channel state information associated with a communication link between the UE and the network device;
transmit, to the network device, the channel state information scheduling request based at least in part on the UE detecting occurrence of at least one channel state information scheduling request trigger indicated in the channel state information scheduling request configuration;
receive, from the network device, a channel state information report trigger, wherein the channel state information report trigger is the grant or activates the grant scheduling the channel state information report based at least in part on the channel state information scheduling request; and
transmit, in response to the channel state information report trigger, the channel state information report over a physical layer uplink channel.

28. The method of claim 1, wherein the one or more channel state information scheduling request triggers relate to at least one of: a change in the channel state information relative to previous channel state information reporting, a modulation and coding scheme (MCS) associated with received packets, or a power headroom associated with uplink transmissions by the UE.

* * * * *